US012359641B2

(12) United States Patent
Fenton

(10) Patent No.: US 12,359,641 B2
(45) Date of Patent: Jul. 15, 2025

(54) METHOD AND APPARATUS FOR A ROTARY THERMODYNAMIC CYCLE WITH SUBSTANTIALLY ISOBARIC FLUID ADMISSION

(71) Applicant: FeTu Limited, Elland (GB)

(72) Inventor: Jonathan Fenton, Cleckheaton (GB)

(73) Assignee: FETU LIMITED, Elland (GB)

( * ) Notice: Subject to any disclaimer, the term of this patent is extended or adjusted under 35 U.S.C. 154(b) by 0 days.

(21) Appl. No.: 18/691,955

(22) PCT Filed: Sep. 16, 2022

(86) PCT No.: PCT/GB2022/052346
§ 371 (c)(1),
(2) Date: Mar. 14, 2024

(87) PCT Pub. No.: WO2023/041920
PCT Pub. Date: Mar. 23, 2023

(65) Prior Publication Data

US 2024/0384693 A1 Nov. 21, 2024

(30) Foreign Application Priority Data

Sep. 17, 2021 (GB) ..................................... 2113321

(51) Int. Cl.
*F02G 1/043* (2006.01)
*F01C 11/00* (2006.01)
(Continued)

(52) U.S. Cl.
CPC ............ *F02G 1/043* (2013.01); *F01C 11/002* (2013.01); *F02G 1/044* (2013.01); *F02G 1/05* (2013.01);
(Continued)

(58) Field of Classification Search
CPC .................................................. F02G 1/00–06
See application file for complete search history.

(56) References Cited

U.S. PATENT DOCUMENTS 3,698,182 A * 10/1972 Knoos ........................ F02G 1/05 60/525
5,467,600 A 11/1995 Kuroiwa
(Continued)

FOREIGN PATENT DOCUMENTS

CN 1563693 A 1/2005
CN 111919012 A 11/2020
(Continued)

*Primary Examiner* — Laert Dounis
(74) *Attorney, Agent, or Firm* — COATS & BENNETT, PLLC

(57) ABSTRACT

A method of operating a thermodynamic apparatus configured as a heat engine or heat pump, the thermodynamic apparatus comprising, in flow series, a first heat exchanger, an expansion sub-chamber and a second heat exchanger, the method comprising transferring fluid from the first heat exchanger to the second heat exchanger via the expansion sub-chamber by: admitting a fluid flow at an intake pressure from the first heat exchanger into the expansion sub-chamber by increasing the volume of the expansion sub-chamber; fluidically isolating the fluid within the expansion sub-chamber from the first heat exchanger; expanding the fluid within the expansion sub-chamber by further increasing the volume of the expansion sub-chamber to reduce the pressure of the fluid from the intake pressure; fluidically coupling the expansion sub-chamber to the second heat exchanger; and transferring fluid out of the expansion sub-chamber to the second heat exchanger by reducing the volume of the expansion sub-chamber.

33 Claims, 16 Drawing Sheets

(51) Int. Cl.

| | |
|---|---|
| ***F02G 1/044*** | (2006.01) |
| ***F02G 1/05*** | (2006.01) |
| ***F25B 9/14*** | (2006.01) |

(52) U.S. Cl.

CPC ............ *F25B 9/14* (2013.01); *F02G 2244/00* (2013.01); *F25B 2309/1428* (2013.01)

(56) References Cited

U.S. PATENT DOCUMENTS

| | | | | |
|---|---|---|---|---|
| 2008/0276615 | A1* | 11/2008 | Bennett ..................... | F01L 1/46 60/614 |
| 2010/0251711 | A1* | 10/2010 | Howes ...................... | F01K 3/12 60/659 |
| 2013/0118170 | A1 | 5/2013 | Mierisch et al. | |
| 2020/0025127 | A1* | 1/2020 | Marko .................... | F02G 1/055 |
| 2020/0408096 | A1 | 12/2020 | Fenton | |

FOREIGN PATENT DOCUMENTS

| | | | | |
|---|---|---|---|---|
| DE | 102010018654 | A1 * | 11/2011 | ........... F02G 1/0435 |
| GB | 2571354 | A | 8/2019 | |
| JP | S5732038 | A | 2/1982 | |
| JP | 2005002976 | A | 1/2005 | |
| RU | 2718089 | C1 | 3/2020 | |
| WO | 8501988 | A1 | 5/1985 | |
| WO | WO-2014080130 | A1 * | 5/2014 | ............... F03G 6/00 |

* cited by examiner

METHOD AND APPARATUS FOR A ROTARY THERMODYNAMIC CYCLE WITH SUBSTANTIALLY ISOBARIC FLUID ADMISSION

The present disclosure relates to a method of operating a thermodynamic apparatus configured as a heat engine or heat pump and a thermodynamic apparatus configured as a heat engine or heat pump.

BACKGROUND

Thermodynamic cycles were first developed and categorised in the early 19th century, firstly to convert heat to power and then further developed to use power to transfer heat from lower temperature to higher temperature in refrigeration and heat pump systems.

Thermodynamic cycles typically comprise of a sequence of processes to compress and expand a fluid and transfer heat to and from the surroundings.

The original theoretical cycle, named the Carnot cycle, defines the maximum amount of work that can be extracted from a heat source when the heat is being transferred to a heat sink. The ideal Carnot cycle comprises an expansion process at constant temperature followed by an expansion process at constant entropy followed by a compression process at constant temperature followed by a compression process at constant entropy. This is illustrated in FIG. 1.

Other theoretical, idealised, cycles have also been described, such as the Stirling cycle comprising an expansion process at constant temperature followed by an expansion process at constant volume followed by a compression process at constant temperature followed by a compression process at constant volume. The Brayton cycle comprises an expansion process at constant pressure followed by an expansion process at constant entropy followed by a compression process at constant pressure followed by a compression process at constant entropy.

A further refinement of the processes is when a working fluid is chosen which changes phase during the heat transfer processes. The most common example is the Rankine cycle, a variant of the Brayton cycle incorporating condensation of the working fluid during the heat rejection process and evaporation of the working fluid during the heat absorption process. These compression and expansion processes are nominally constant pressure processes, but due to the phase change they are also constant temperature processes. The Rankine cycle forms the basis of most power generation systems using water as the working fluid in fired power stations as well as being the basis for Organic Rankine Cycle systems for the generation of electricity from heat.

However, the idealised thermodynamic cycle cannot be achieved in practice due to losses within the systems. As such, real-life thermodynamic cycles look to approximate the idealised cycles as closely as possible.

Creating practical machines to convert heat to power or to utilise power input to transfer heat requires some compromise. These practical machines tend to include a fluid that is circulated in a closed cycle and is subject to compression and/or expansion.

Friction within the machine cannot be eliminated and means that the compression and expansion processes are not loss-free and therefore are not reversible.

When two-phase working fluids are used, some compression and expansion technologies require to be protected against the adverse effects of liquid ingress or the formation of liquid during the process. For example, some types of turbine require the inlet to be dry gas. Some types of compressor require the inlet to be completely free of liquid and no liquid to form during the compression process. Others can tolerate a fine mist of liquid droplets in the inlet but more often cannot handle larger agglomerations of liquid. All of these precautions might restrict the range of applications of the machine, or may increase its complexity or reduce its thermodynamic efficiency. In some cases, liquid droplets can cause severe physical damage to compressors or expanders.

It is an object of the present invention to overcome at least some of the above referenced drawbacks.

SUMMARY

According to the present disclosure there is provided a thermodynamic apparatus and method of operating a thermodynamic apparatus configured as a heat engine or heat pump as set forth in the claims. Other features of the invention will be apparent from the dependent claims, and the description which follows.

According to a first aspect, there is provided a method of operating a thermodynamic apparatus configured as a heat engine or heat pump, the thermodynamic apparatus comprising, in flow series, a first heat exchanger, an expansion sub-chamber and a second heat exchanger, the method comprising transferring fluid from the first heat exchanger to the second heat exchanger via the expansion sub-chamber by: admitting a fluid flow at an intake pressure from the first heat exchanger into the expansion sub-chamber by increasing the volume of the expansion sub-chamber; fluidically isolating the fluid within the expansion sub-chamber from the first heat exchanger; expanding the fluid within the expansion sub-chamber by further increasing the volume of the expansion sub-chamber to reduce the pressure of the fluid from the intake pressure; fluidically coupling the expansion sub-chamber to the second heat exchanger; and transferring fluid out of the expansion sub-chamber to the second heat exchanger by reducing the volume of the expansion sub-chamber.

The provision of the method as described above enables an efficient manner for transporting an expanded fluid between a first heat exchanger and a second heat exchanger. The method enables a high work output or high energy transfer as required and is applicable across many applications.

The thermodynamic apparatus may comprise a compression sub-chamber, the method comprising transferring fluid out of the second heat exchanger at a transfer pressure to the compression sub-chamber by increasing the volume of the compression sub-chamber.

The method may comprise fluidically isolating the compression sub-chamber from the second heat exchanger; compressing the fluid within the compression sub-chamber by reducing the volume of the compression sub-chamber to increase the pressure of the fluid. In other words, the method may comprise fluidically isolating the compression sub-chamber from the second heat exchanger; increasing the pressure of the fluid within the compression sub-chamber by reducing the volume of the compression sub-chamber.

The method may comprise: fluidically coupling the compression sub-chamber with the first heat exchanger; and transferring fluid out of the compression sub-chamber to the first heat chamber by reducing the volume of the compression sub-chamber.

In one example, the temperature of the fluid leaving the expansion sub-chamber is approximately equal to the temperature of the fluid leaving the compression sub-chamber.

The process of admitting a fluid flow at an intake pressure from the first heat exchanger into the expansion sub-chamber may be substantially isobaric.

The process of expanding the fluid within the expansion sub-chamber by further increasing the volume of the expansion sub-chamber may be approximately adiabatic.

The process of transferring fluid flow out of the second heat exchanger to the compression sub-chamber may be substantially isobaric.

The process of increasing the pressure of the fluid within the compression sub-chamber by reducing the volume of the compression sub-chamber may be approximately adiabatic.

The apparatus may comprise an expansion chamber and may comprise a first piston, and the expansion sub-chamber may be a variable volume aspect defined by the expansion chamber and the first piston.

In one example, the step of the volume of the expansion sub-chamber being increased to admit fluid flow from the first heat exchanger into the expansion sub-chamber occurs during an intake phase of a charge stroke in which there is relative movement in a first direction between the first piston and the expansion chamber.

The step of further increasing the volume of the expansion sub-chamber until it reaches a predetermined volume where said fluid reaches a first threshold pressure may occur during an expansion phase of the charge stroke in which there is continued relative movement in the first direction between the first piston and the expansion sub-chamber.

The step of transferring fluid flow out of the expansion sub-chamber to the second heat exchanger by reducing the volume of the expansion sub-chamber occurs during a discharge stroke in which there is relative movement of the first piston and the expansion chamber in a second direction, which is opposite to the direction of relative movement in the charge stroke.

The apparatus may comprise a compression chamber and may comprise a second piston, and the compression sub-chamber is a variable volume aspect defined by the compression chamber and the second piston, wherein the step of transferring fluid flow out of the second heat exchanger at a transfer pressure to the compression sub-chamber by increasing the volume of the compression sub-chamber occurs during a charge stroke in which there is relative movement of the second piston and the compression chamber.

The step of increasing the pressure of the fluid within the compression sub-chamber by reducing the volume of the compression sub-chamber may occur during a compression phase of discharge stroke in which there is relative movement of the second piston in direction, opposite to the direction of relative movement in the charge stroke of the compression sub-chamber.

The first piston and the second piston may be integral with each other.

The expansion sub-chamber and compression sub-chamber may be located on either side of the first piston within a reciprocating machine, wherein movement of the first piston changes the volume of the expansion sub-chamber and the compression sub-chamber.

The expansion sub-chamber and the compression sub-chamber may be located in different reciprocating machines.

The thermodynamic apparatus may comprise a second expansion sub-chamber and a second compression sub-chamber, the method comprising: transferring fluid flow out of second expansion sub-chamber to the second heat exchanger at the transfer pressure by reducing the volume of the second expansion sub-chamber as fluid flow is being admitted and expanded in the first expansion sub-chamber.

The method may include transferring fluid flow out of the second heat exchanger into the second compression sub-chamber by increasing the volume of the second compression sub-chamber as fluid flow is being transferred out of the second expansion sub-chamber; fluidically isolating the second compression sub-chamber from the second heat exchanger; compressing the fluid within the second compression sub-chamber by reducing the volume of the second compression sub-chamber to increase the pressure of the fluid. In other words, the method includes the steps of fluidically isolating the second compression sub-chamber from the second heat exchanger; increasing the pressure of the fluid within the second compression sub-chamber by reducing the volume of the second compression sub-chamber.

The method may include fluidically coupling the second compression sub-chamber with the first heat exchanger; and transferring said fluid-flow out of the second compression sub-chamber to the first heat exchanger by continuing to reduce the volume of the second compression sub-chamber, wherein these steps occur as fluid flow is being transferred to the second heat exchanger from the first expansion sub-chamber.

The apparatus may be configured to work as a heat engine and heat is removed from the fluid as it passes through the second heat exchanger.

The apparatus may be configured to work as a heat pump and heat is added to the fluid as it passes through the second heat exchanger.

According to a second example, there is provided a thermodynamic apparatus configured as a heat engine or heat pump: wherein the apparatus comprises an expansion sub-chamber and is configured to: admit a fluid flow at an intake pressure into the expansion sub-chamber by increasing the volume of the expansion sub-chamber; fluidically isolate the fluid within the expansion sub-chamber; expand the fluid within the expansion sub-chamber by further increasing the volume of the expansion sub-chamber to reduce the pressure of the fluid from the intake pressure; fluidically couple the expansion sub-chamber to a heat exchanger; and transfer fluid flow out of the expansion sub-chamber to said heat exchanger by reducing the volume of the expansion sub-chamber.

The apparatus may include a first heat exchanger; and a second heat exchanger, wherein the fluid is admitted into the expansion sub-chamber from the first heat exchanger and transferred to the second heat exchanger from the expansion sub-chamber.

The thermodynamic apparatus comprises a compression sub-chamber, the apparatus configured to: transfer fluid flow out of the second heat exchanger at a transfer pressure to the compression sub-chamber by increasing the volume of the compression sub-chamber.

The apparatus may be configured to: fluidically isolate the compression sub-chamber from the second heat exchanger; compress the fluid within the compression sub-chamber by reducing the volume of the compression sub-chamber to increase the pressure of the fluid. In other words, the apparatus may be configured to: fluidically isolate the compression sub-chamber from the second heat exchanger; increase the pressure of the fluid within the compression sub-chamber by reducing the volume of the compression sub-chamber.

The apparatus may be configured to: fluidically couple the compression sub-chamber with the first heat exchanger; and transfer fluid flow out of the compression sub-chamber to the first heat chamber by reducing the volume of the compression sub-chamber.

The apparatus may comprise an expansion chamber and may comprise a first piston, and the expansion sub-chamber is a variable volume aspect defined by the expansion chamber and the first piston.

The volume of the expansion sub-chamber may be configured to be increased to admit fluid flow from the first heat exchanger into the expansion sub-chamber during an intake phase of a charge stroke in which there is relative movement in a first direction.

The apparatus is configured to further increase the volume of the expansion sub-chamber during an expansion phase of the charge stroke in which the relative movement of first piston and the expansion chamber is configured to continue to move in the first direction.

The first piston may be configured to move relative to the expansion chamber in a second direction during a discharge stroke, the second direction being opposite to the first direction to reduce the volume of the expansion sub-chamber to transfer fluid flow out of the expansion sub-chamber to the second heat exchanger.

The apparatus may comprise a compression chamber and a second piston and the compression sub-chamber is a variable volume aspect defined by the compression chamber and the second piston, wherein the volume of the compression sub-chamber is configured to be increased during a charge stroke in which there is relative movement of the second piston and the compression chamber.

According to a third aspect, there may be provided a method of operating a thermodynamic apparatus configured as a heat engine or heat pump, the method comprising: inducing a fluid flow at an intake pressure from a first heat exchanger into a compression sub-chamber by increasing the volume of the compression sub-chamber; fluidically isolating the fluid within the compression sub-chamber from the first heat exchanger; increasing the pressure of the fluid within the compression sub-chamber by decreasing the volume of the compression sub-chamber; fluidically coupling the compression sub-chamber to a second heat exchanger; and inducing fluid flow out of the compression sub-chamber to the second heat exchanger by further reducing the volume of the expansion sub-chamber.

According to a further aspect, there may be provided a method of changing a fluid volume comprising: inducing a fluid from a first heat exchanger to an expansion sub-chamber; isolating the fluid within the expansion sub-chamber from the first heat exchanger; and expanding the fluid within the expansion sub-chamber until said fluid reaches a first threshold pressure.

In one example, there is provided an apparatus for a heat engine or heat pump comprising: a first expansion sub-chamber, wherein the first expansion sub-chamber is configured to cycle through a first expansion sub-chamber charge stroke and a first expansion chamber discharge stroke; a first compression sub-chamber, wherein the first compression sub-chamber is configured to cycle through a first compression sub-chamber charge stroke and a first compression sub-chamber discharge stroke, wherein the apparatus is provided with an expansion sub-chamber inlet port for fluid to enter the expansion sub-chamber during the expansion sub-chamber charge stroke; an expansion sub-chamber outlet port for fluid to exit the expansion sub-chamber during the expansion sub-chamber discharge stroke; a compression sub-chamber inlet port for fluid to enter the compression sub-chamber during the compression sub-chamber charge stroke; and a compression sub-chamber outlet port for fluid to exit the compression sub-chamber during the compression sub-chamber discharge stroke; wherein the apparatus is configured for the expansion chamber inlet port to be open during a first part of the first expansion sub-chamber charge stroke and closed during a second part of the first expansion sub-chamber charge stroke; and wherein the apparatus is configured for the compression sub-chamber outlet port to be closed during a first part of the first compression sub-chamber discharge stroke and open during a second part of the first compression sub-chamber discharge stroke.

The first expansion sub-chamber and the first compression sub-chamber may be configured to operate in antiphase.

In one example, there is a second expansion sub-chamber configured to cycle through a second expansion sub-chamber charge stroke and a second expansion sub-chamber discharge stroke, wherein the first and second expansion sub-chambers are configured to operate in antiphase; a second compression sub-chamber configured to cycle through a second compression sub-chamber charge stroke and a second compression sub-chamber discharge stroke, wherein the first and second compression sub-chambers are configured to operate in antiphase, wherein the expansion chamber inlet port is provided for fluid to enter each expansion sub-chamber during the respective charge stroke, the expansion sub-chamber outlet port is provided for fluid to exit each expansion sub-chamber during the respective discharge stroke, the compression sub-chamber inlet port is provided for working fluid to enter each compression sub-chamber during the respective charge stroke; and the compression sub-chamber outlet port is provided for fluid to exit each compression sub-chamber during the respective discharge stroke, wherein the apparatus is configured for the expansion sub-chamber inlet port to be open to a respective expansion sub-chamber during a first part of each expansion sub-chamber charge stroke and closed to the respective expansion sub-chamber during a second part of each expansion sub-chamber charge stroke, and the apparatus is configured for the compression sub-chamber outlet port to be closed to a respective compression sub-chamber during a first part of each compression sub-chamber discharge stroke and open to a respective compression sub-chamber during a second part of each compression sub-chamber discharge stroke.

In one example, the apparatus is configured so that when the expansion sub-chamber inlet port is open the compression sub-chamber outlet port is closed and when the compression sub-chamber outlet port is open the expansion chamber inlet port is closed.

According to a further aspect there may be provided a fluid pump to transfer saturated fluid from the second heat exchanger to the first heat exchanger. The fluid pump may be used in addition to the compression sub-chamber or may replace it.

The present disclosure relates to a thermodynamic cycle to be used in conjunction with expansion equipment that would be normally classified or claimed to be 'positive displacement' by nature or operation.

The above-mentioned features may be combined together in various combinations.

BRIEF DESCRIPTION OF THE DRAWINGS

Examples of the present disclosure will now be described with reference to the accompanying drawings.

DETAILED DESCRIPTION

Figure 1:
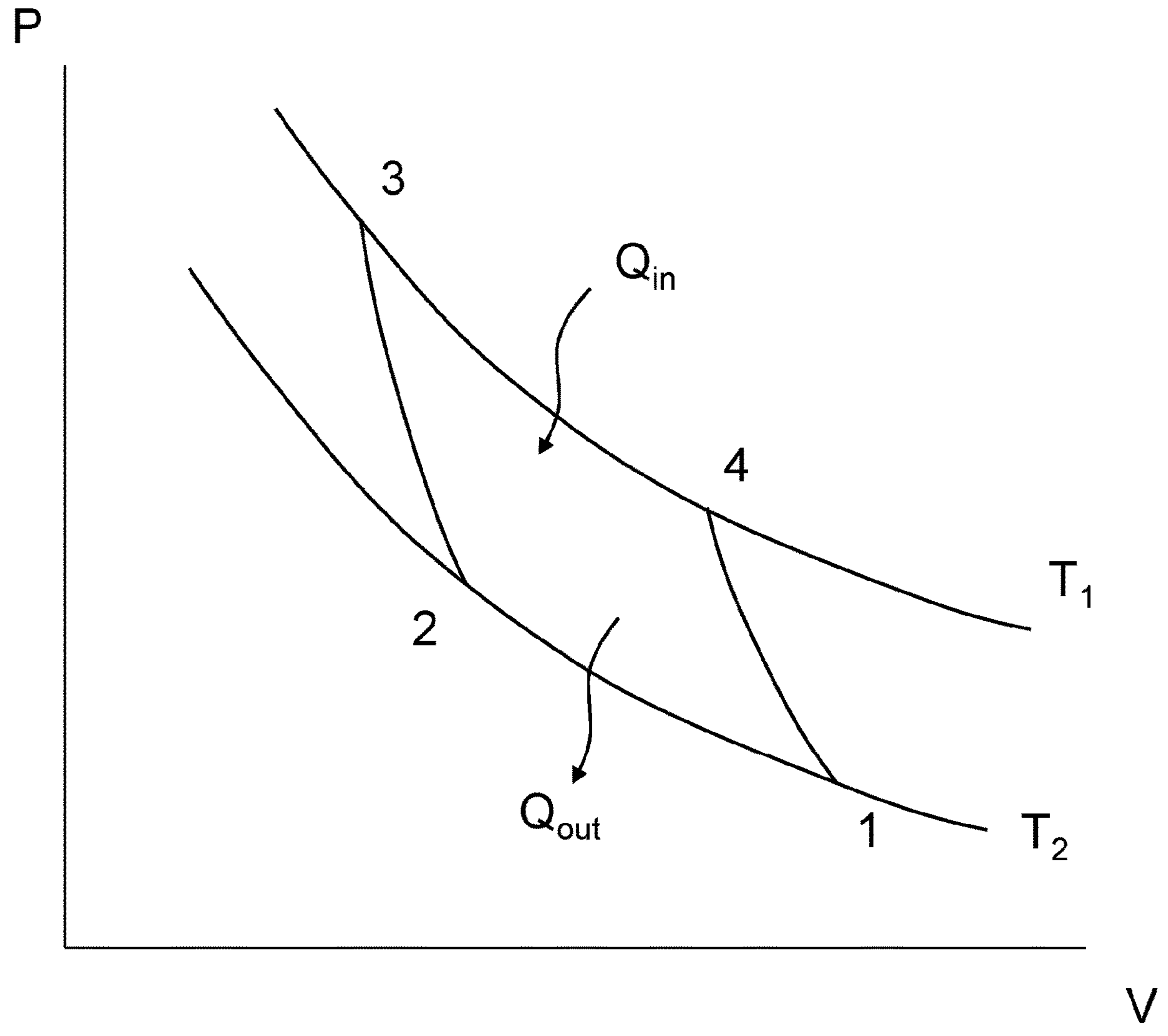
FIG. 1 shows a Pressure/Volume chart of an idealised Carnot cycle

FIG. 1 shows a pressure/volume graph of an idealised Carnot cycle when acting as a heat engine. In this cycle, a working fluid is configured to pass through four thermodynamic processes.

Between points 1 and 2 of the graph shown in FIG. 1, heat is transferred isothermally from the fluid to a low temperature reservoir at constant temperature $T_2$. The fluid in the engine is in thermal contact with the cold reservoir at temperature $T_2$. The surroundings do work on the fluid, for example by driving the piston to reduce the volume of the chamber in which the fluid in contained, causing an amount of heat energy $Q_{out}$ to leave the system to the low temperature reservoir and the entropy of the system to decrease.

Between points 2 and 3 on the graph shown in FIG. 1, the fluid undergoes an adiabatic compression (or isentropic compression). Once again, the fluid in the engine is thermally insulated from the hot and cold reservoirs, and the engine is assumed to be frictionless, hence reversible. During this step, the surroundings continue to do work on the fluid, for example by driving the piston further and further reducing the volume of the chamber in which the fluid is contained. This has the effect of increasing the fluids internal energy and causing its temperature to rise back to $T_1$ due to the work added to the system, but the entropy remains unchanged.

At point 3 on the chart, the fluid is in a relatively high-pressure state at a relatively low volume. Between points 3 and 4 on the graph, heat is transferred reversibly from the high temperature reservoir at constant temperature (i.e. isothermal heat addition).

During this step the fluid expands, doing work on the surroundings, for example by pushing a piston. The pressure drops from points 3 to 4, but the temperature of the fluid does not change during the process because it is in thermal contact with the hot reservoir at $T_1$, and thus the expansion is isothermal. Heat energy $Q_{in}$ is absorbed from the high temperature reservoir resulting in an increase in the entropy of the fluid.

Between points 4 and 1 on the graph shown in FIG. 1, the fluid is thermally insulated from both the hot and cold reservoirs and undergoes an isentropic (or reversible adiabatic) expansion. The fluid continues to expand by reduction of pressure, doing work on the surroundings, for example, by continuing to move the piston to increase the volume of a chamber in which the fluid in contained. The fluid will lose an amount of internal energy equal to the work done. The gas expansion without heat input causes it to cool to a "colder" temperature, $T_2$. The entropy remains unchanged.

At this point the fluid returns to the same state as at the start of step 1.

Each of these four processes in the Carnot cycle follows the polytropic relationship of $PV^n=C$, where n is the polytropic index.

If the polytropic index, n, equals 0 then the process is isobaric. If the index, n, equals 1 the process is isothermal. In both of these processes both heat and work may be transferred during the process. If the index is equal to the ratio of specific heats (also known as the isentropic exponent), $\gamma$, for the fluid used then the process is isentropic. As the index, n, increases above $\gamma$, the process tends towards isochoric (as n tends to infinity). This is another special case, where heat is transferred but no work is done by or on the surroundings.

In the example of the Carnot cycle described above, the index, n, varies as follows:

Step 1 to 2: —(Isothermal compression): n=1

Step 2 to 3: —(Adiabatic compression): n=γ

Step 3 to 4: —(Isothermal expansion): n=1

Step 4 to 1: —(Adiabatic expansion): n=γ

Figure 2A:
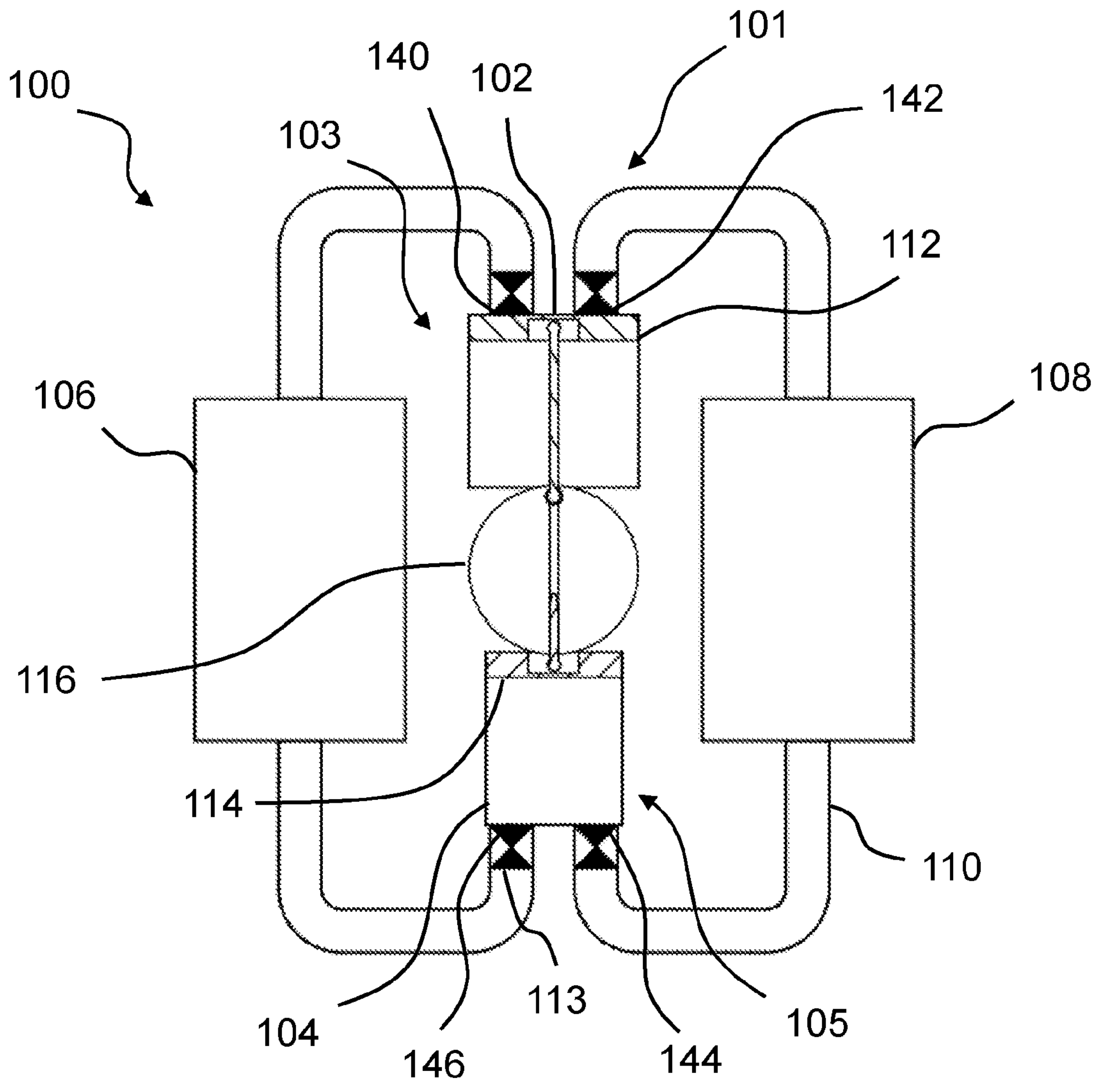
FIG. 2A shows a schematic view of a first example of an apparatus configured as a heat engine or heat pump according to the present disclosure.

FIG. 2A shows a highly schematic example of an apparatus 100 configured as a heat engine or heat pump. The apparatus 100 is configured to change a volume of a fluid. The apparatus 100 includes an expansion sub-chamber 102 for receiving a fluid. As will be described in more detail below, the apparatus 100 may be configured to receive and transfer fluid between a first heat exchanger 106 and a second heat exchanger 108. In one example, the apparatus 100 includes, in flow series, a first heat exchanger 106, the expansion sub-chamber 102 and a second heat exchanger 108. The apparatus 100 may also include a compression sub-chamber 104 located after the second heat exchanger 108 in the flow series. Together, the expansion sub-chamber 102 and the compression sub-chamber 104 may be considered to be a fluid displacement device 101.

The expansion sub-chamber 102 may be considered to be an instantaneous, but variable sized, aspect of an expansion chamber 103. That is to say that the volume of the expansion sub-chamber 102 may vary throughout the operation of the apparatus 100.

The expansion chamber 103 may be a fixed size chamber in which a displacement means, such as a first piston 112, may move relative to the expansion chamber 103 to vary the volume of the expansion sub-chamber 102. The first piston 112 is configured to move relative to the expansion chamber 103 to change the volume of the expansion sub-chamber 102. The first piston 112 may be used to compress and/or expand fluid within the expansion sub-chamber 102 depending on the operation. That is to say that in some cases the expansion chamber 103 may be fixed and the first piston 112 may be movable through the expansion chamber 103 to vary the volume of the expansion sub-chamber 102. In other examples, both the first piston 112 and the expansion chamber 103 move to vary the volume of the expansion sub-chamber 102 (for example, the first piston 112 may merely rotate). In other examples, the first piston 112 may be fixed and the expansion chamber 103 may move to vary the volume of the expansion sub-chamber 102. In these examples, the first piston 112 is configured to move relative to the expansion chamber 103 to vary the volume of the expansion sub-chamber 102.

Similarly, the compression sub-chamber 104 may be considered to be an instantaneous, but variable sized, aspect of a compression chamber 105. That is to say that the volume of the compression sub-chamber 104 may vary throughout the operation of the apparatus 100. The compression chamber 105 may be a fixed size chamber in which a positive displacement means, such as a second piston 114, may move relative to, to vary the volume of the compression sub-chamber 104.

The second piston 114 within the compression chamber 105 may be configured to sweep through the compression chamber 105 to vary the volume of the compression sub-chamber 104. The second piston 114 may be used to compress and/or expand fluid within the compression sub-chamber 104 depending on the operation. That is to say that in some cases the compression chamber 105 may be considered to be fixed and the second piston 114 may be movable through the compression chamber 105 to vary the volume of the compression sub-chamber 104. In other examples, both the second piston 114 and the compression chamber 105 move to vary the volume of the compression sub-chamber 104 (for example, the second piston 114 may merely rotate). In other examples, the second piston 114 may be fixed and the compression chamber 105 may move to vary the volume of the compression sub-chamber 104.

Whilst a piston is used to describe the positive displacement means in this specification, any alternative positive displacement means may be used. Such alternatives include but are not limited to a diaphragm.

Figure 8:
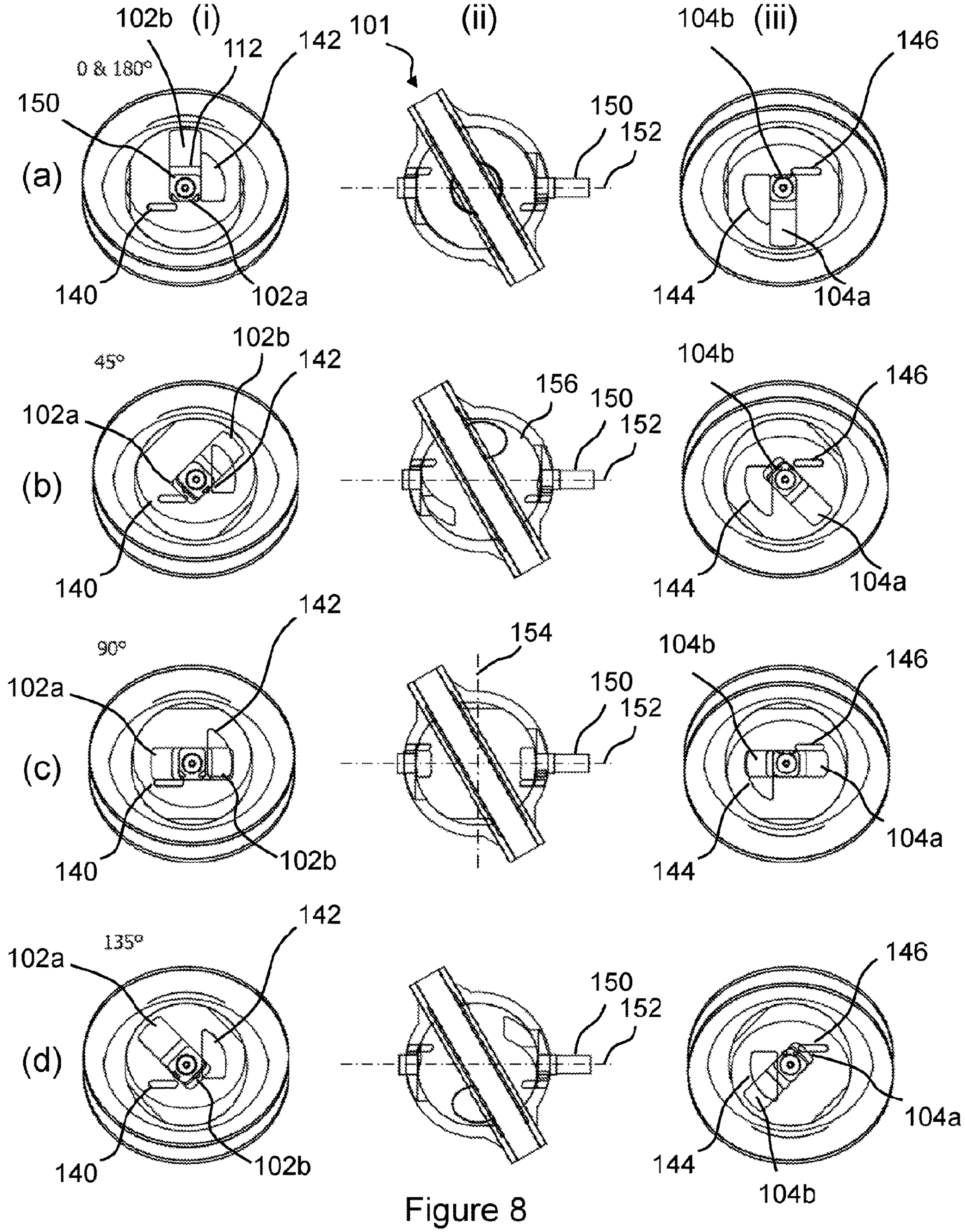
FIG. 8 shows a schematic view of a third example of apparatus configured as a heat pump or heat engine according to the present disclosure.

In one example, the first piston 112 and the second piston 114 are integral with each other. For example, the first piston 112 and the second piston 114 are provided on one component, for example as shown in FIG. 8.

The first heat exchanger 106 may be a first reservoir. In some examples, the first heat exchanger 106 provides a source of heat energy that can be added to the fluid within the apparatus 100.

The second heat exchanger 108 may be a second reservoir. The second heat exchanger 108 may be a heat sink and heat energy may be removed from the fluid passing through the second heat exchanger 108.

In one example, the first heat exchanger 106 and the second heat exchanger 108 may be several orders greater in volume than the expansion sub-chamber 102 and the compression sub-chamber 104. In one example, the first heat exchanger 106 and the second heat exchanger 108 are between 5 to 15 times larger than the volume of the expansion sub-chamber 102 and the compression sub-chamber 104, preferably at least 10 times larger (or more) than the volume of the expansion sub-chamber 102 and the compression sub-chamber 104. Providing larger heat exchangers compared with the expansion chambers enables the expansion and compression processes to run relatively fast to reduce the potential for in chamber heat transfer. However, the heat transfer in the heat exchangers may run relatively slowly. That is to say that this difference in volume permits a relatively slow heat exchange process, when compared to the compression or expansion processes described below. A 'fast flowing small volume heat exchanger' is not practical or attractive in a real-world heat engine or heat exchange applications. In contrast, the present disclosure seeks to maximise the volume, surface area, and heat transfer during the heat exchange process. The larger volume of the heat exchanger also reduces pressure fluctuations coming from the expansion sub-chamber 102 and compression sub-chamber 104, considering any change in pressure is merely wasted energy and therefore actively pursues, to as fuller extant as possible, no change in pressure during the substantially isobaric fluid transfer processes.

In some examples the volume of the first heat exchanger 106 and the second heat exchanger 108 will not be the same.

In examples, there may be pipework 110 or ductwork to connect the expansion sub-chamber 102 to the first heat exchanger 106 and second heat exchanger 108. The apparatus 100 may also include pipework 110 or ductwork to connect the compression sub-chamber 104 to the first heat exchanger 106 and the second heat exchanger 108.

In one example, the apparatus 100 includes a plurality of valves 113 that may be positioned between the various elements of the apparatus 100. For example, there may be one or more valves between the first heat exchanger 106 and the expansion sub-chamber 102. When the valves(s) between the first heat exchanger 106 and the expansion sub-chamber 102 is not closed, fluid may flow between the first heat exchanger 106 and the expansion sub-chamber 102 (or visa-versa depending on the intended operation). When the valve is open between two elements and fluid can flow between them, then the elements are considered to be fluidically coupled together. When the valve(s) are closed, fluid is prevented from flowing between the first heat exchanger 106 and the expansion sub-chamber 102 (or visa-versa depending on the intended operation). When the valve(s) is closed, the elements are considered to be fluidically isolated from each other.

By fluidically coupled it is meant that fluid may flow between the various elements. Fluidically coupled is analogous to fluidically connected.

In one example, the expansion chamber 103 may comprise an inlet port 140 through which fluid may flow into the expansion sub-chamber 102. The expansion chamber 103 may also include an outlet port 142 through which fluid may flow to exit the expansion sub-chamber 102. For example, when operating as a heat engine, the expansion sub-chamber 102 is fluidically coupled with the first heat exchanger 106 to admit fluid into the expansion chamber 102, the inlet port 140 is considered to be open. When the expansion sub-chamber 102 is fluidically coupled with the second heat exchanger 108 to transfer fluid to the second heat exchanger 108, the outlet port 140 is open. When the expansion sub-chamber 102 is fluidically isolated, the inlet port 140 and the outlet port 142 is closed. The compression chamber 103 may comprise an inlet port 144 through which fluid may flow into the compression sub-chamber 104. The compression chamber 103 may also include an outlet port 146 through which fluid may flow to exit the compression sub-chamber 104. In the example of a heat engine, fluid is configured to flow through the inlet port 144 from the second heat exchanger 108 and flow out of the outlet port 146 to the first heat exchanger 106.

In one example, the ports 140, 142, 144, 146 may be positioned in a housing around the expansion sub-chamber 102 and the compression sub-chamber 104.

The valve(s) between the first heat exchanger 106 and the expansion sub-chamber 102 may be positioned at the inlet port 140 of the expansion chamber 103, at a port of the first heat exchanger 106 or within the pipework 110 between the first heat exchanger 106 and the expansion sub-chamber 102. There may be similar valves between the expansion sub-chamber 102 and the second heat exchanger 108, the second heat exchanger 108 and the compression sub-chamber 104, the compression sub-chamber 104 and the first heat exchanger 106. In other examples, the apparatus 100 does not include valves, but the geometry of the apparatus is set such that the various elements are fluidically isolated/coupled together as required (e.g. by opening/closing the ports 140, 142, 144, 146 due the relative position of the expansion sub-chamber 102 and the compression sub-chamber 104 throughout the operation of the apparatus).

In some examples, the expansion sub-chamber 102 and the compression sub-chamber 104 may be located on either side of a single piston within a single chamber. That is to say that the expansion sub-chamber 102 may be the region of the single chamber on a first side of the piston and the compression sub-chamber 104 may be considered to be the region of the single chamber on a second side of the piston. In this example, a single piston may be used to compress and/or expand the fluids within the expansion sub-chamber 102 and the compression sub-chamber 104.

In some examples, the expansion sub-chamber 102 and the compression sub-chamber 104 are separate, distinct chambers (i.e. they do not share a common wall or boundary or drivetrain) and the movement of the pistons 112, 114 is not linked. In other examples, the piston within the expansion chamber 103 and the piston within the compression chamber 105 are linked. For example, connecting rods may connect the piston 112 within the expansion chamber 103 and the piston 114 within the compression chamber 105 to a movement mechanism such as a flywheel 116.

In the example of the apparatus 100 working as a heat engine, work may be extracted from the apparatus 100 by the fluid doing work on the one or more pistons 112, 114, which, in some examples, results in movement of a crank, flywheel or drive shaft. This work may be used to drive a powertrain or generate electricity.

In the example of the apparatus 100 working as a heat pump, work may be input into the apparatus 100, for example, by the movement of the pistons. A motor may be used to drive a cranked drive shaft to drive the pistons 112, 114. The heat engine may be used to transfer heat from one location to another.

In some examples, the volume of the expansion sub-chamber 102 and the volume of the compression sub-chamber 104 is substantially identical. In other examples, the volume of the expansion sub-chamber 102 is greater than the volume of the compression sub-chamber. In some examples, the presence of a connecting rod or piston rod in the compression sub-chamber 104 accounts for a desired difference in volume between the expansion sub-chamber 102 and the compression sub-chamber 104.

Figure 2B:
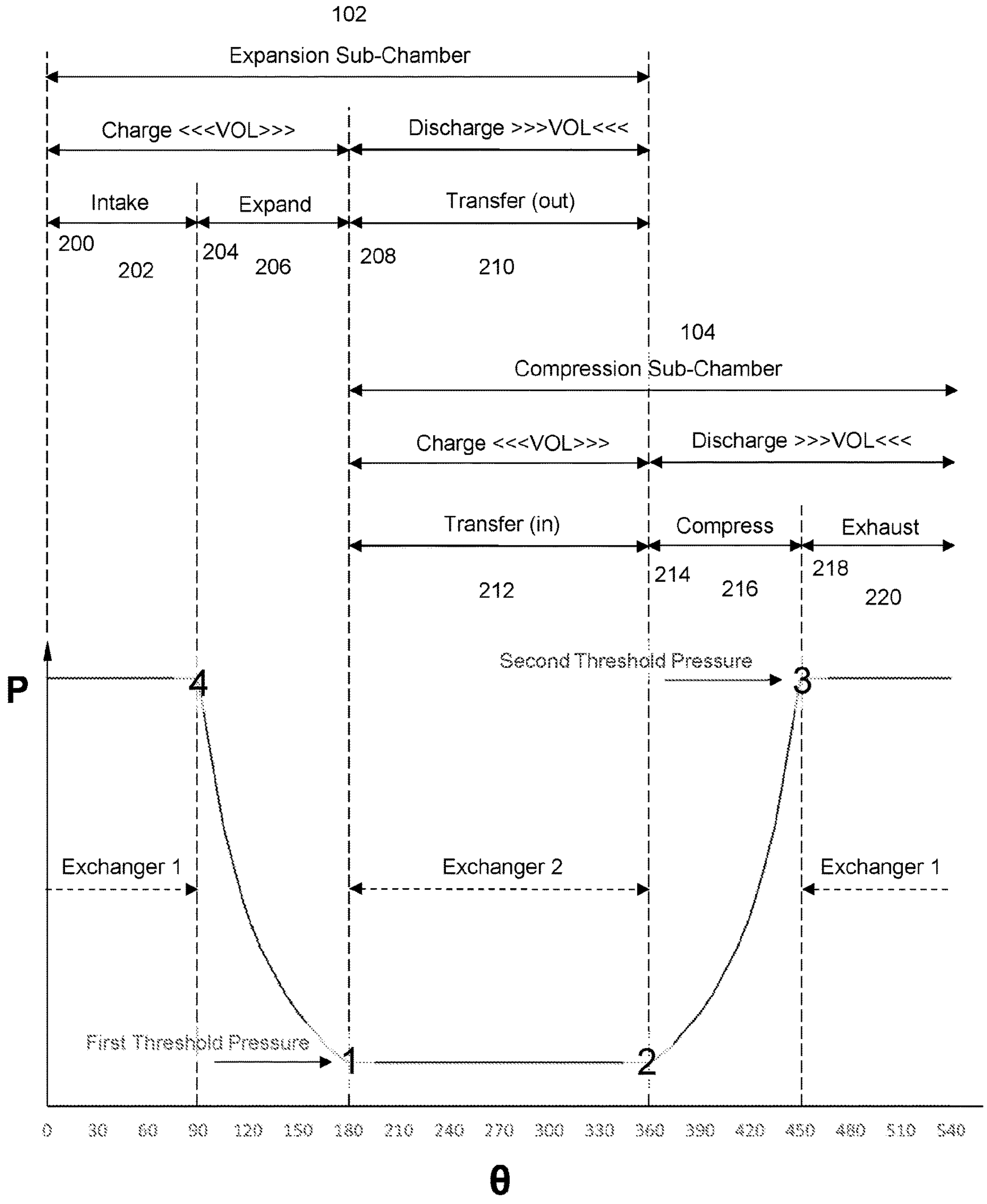
FIG. 2B shows a chart example of pressure change throughout a cycle of the apparatus.

FIG. 2B shows a chart example of pressure of the fluid during a thermodynamic cycle run on the apparatus when configured as a heat engine in conjunction with a compressible fluid. In other examples the fluid may be partially or fully saturated and not be compressible and may be required to be pumped between the first and second threshold pressures.

The angle on the x-axis represents the relative position of the apparatus throughout a single cycle (with 0 degrees being the start of a cycle and 360 degrees representing the apparatus returning to the same position at the start of the cycle).

Figure 3A:
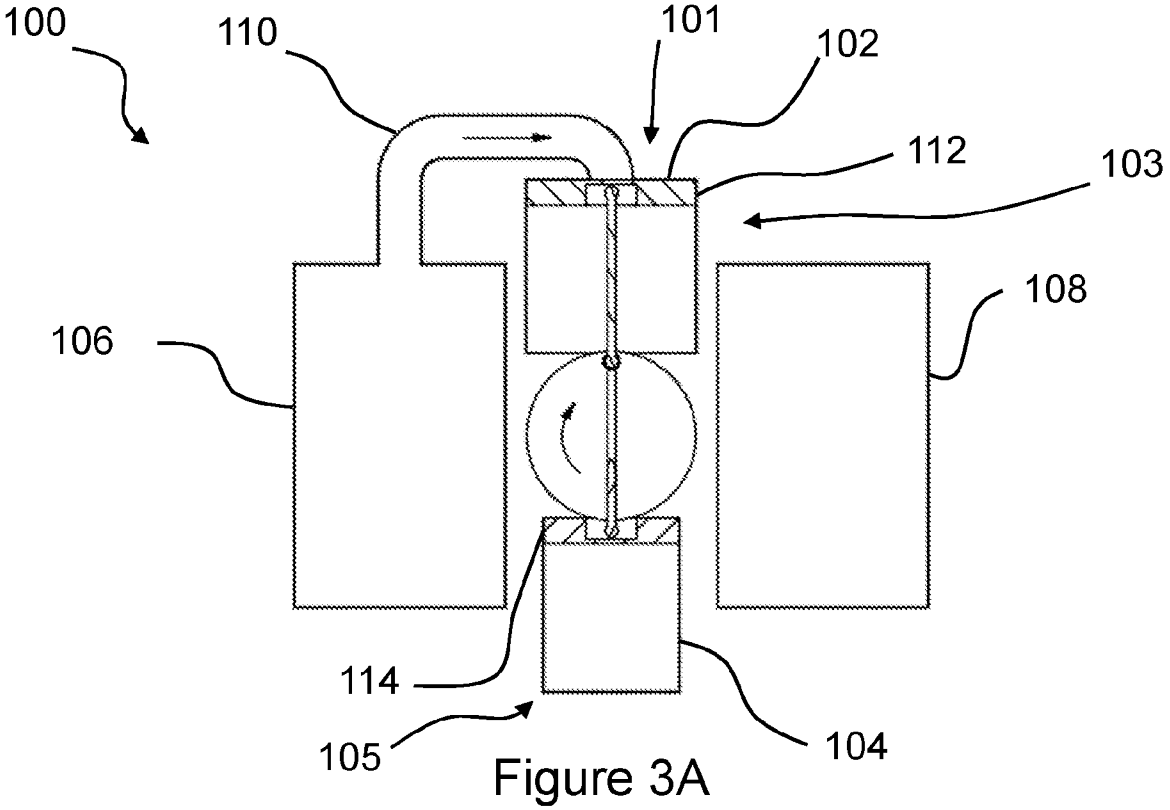
FIG. 3A shows a schematic view of the apparatus of FIG. 2A at a first point during a heat engine cycle.

FIG. 2B will be referred to when discussing the various steps of the apparatus 100 shown in FIGS. 3A through to 3E.

FIG. 3A shows a schematic of initial arrangement of an example of the apparatus 100 according to an embodiment in which the apparatus 100 is configured to work as a heat engine. In some examples, the expansion sub-chamber 102 may be referred to as a first sub-chamber and the compression sub-chamber 104 may be referred to as a second sub-chamber. In this example of the apparatus 100 working as a heat engine, the volume of the expansion chamber 103 may be larger than the volume of the compression chamber 105. The difference in volume is to partially account for the reduction in volume when heat is rejected into the second heat exchanger and heat is added to the fluid passing through the first heat exchanger 106.

In this schematic example, the pipework 110 is shown as being present or not present to indicate whether fluid is able to flow between the various elements of the apparatus (or to indicate that the port is open or closed). For example, the presence of a pipework 110 may indicate that a valve is open between elements and the absence of pipework may indicate that a valve is closed between elements. Alternatively, the presence of pipework 110 may indicate that the geometry of the apparatus 100 has moved to a position in which the connected elements are open to each other to allow fluid to flow.

Focusing on the operation of the expansion sub-chamber 102, FIG. 3A shows the initial arrangement or example of a starting point in which the piston 112 in expansion sub-chamber 102 is at minimum volume. In this initial arrangement, the expansion sub-chamber 102 is fluidically coupled with the first heat exchanger 106 (i.e. the inlet port is open). The initial arrangement as shown in FIG. 3A corresponds to point 200 on the chart in FIG. 2B.

Figure 3B:
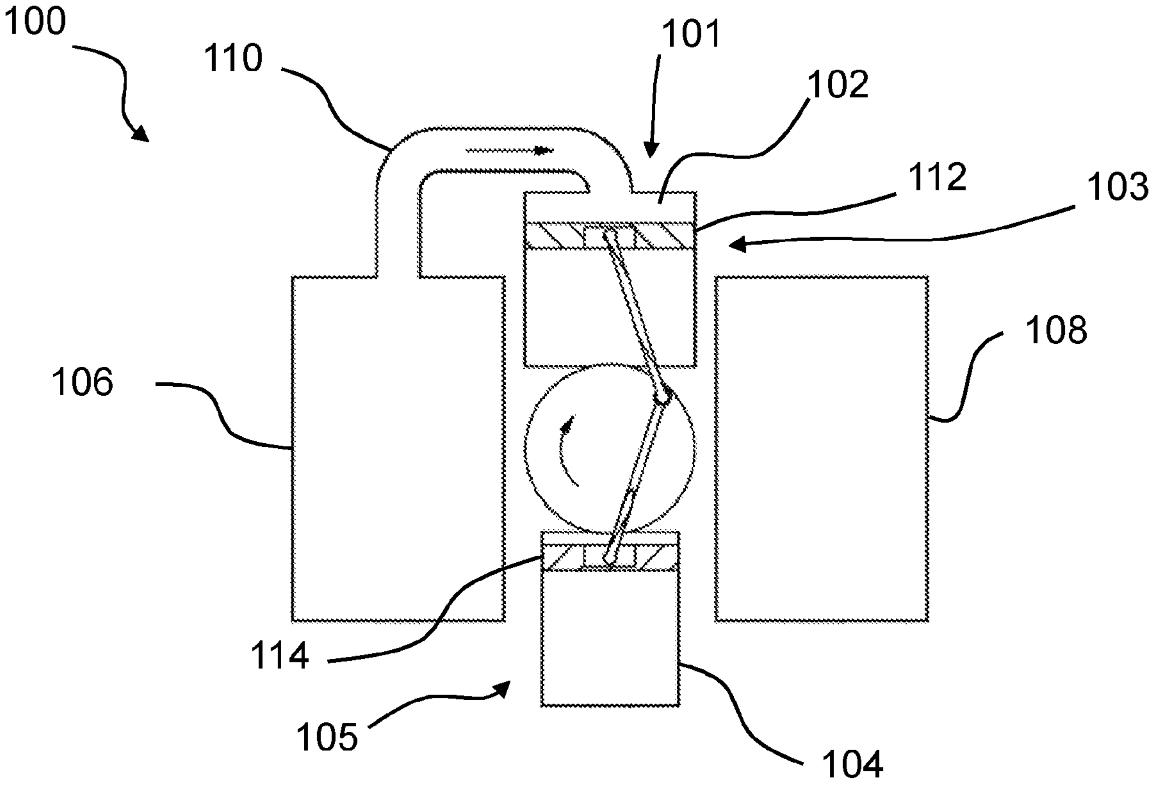
FIG. 3B shows a schematic view of the apparatus of FIG. 2A at a second point during a heat engine cycle.
Figure 3C:
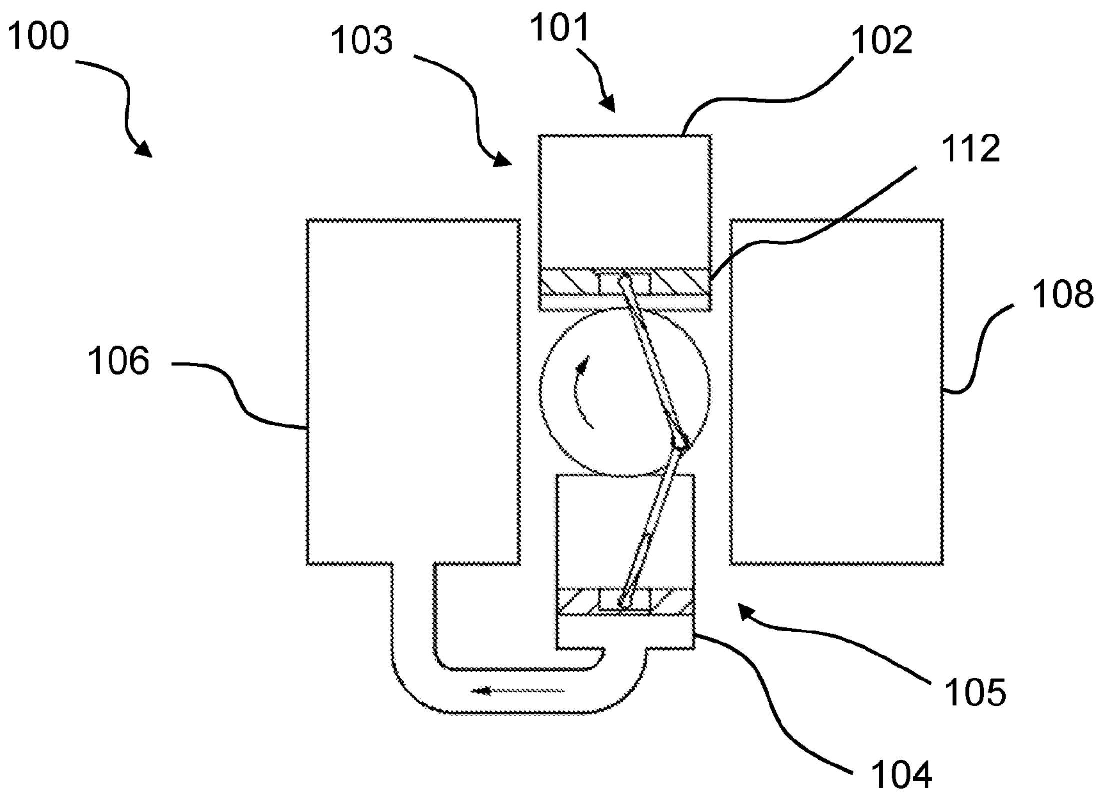
FIG. 3C shows a schematic view of the apparatus of FIG. 2A at a third point during a heat engine cycle.

FIG. 3B shows the next step in the process in which a charge stroke in the expansion sub-chamber 102 has been initiated. The fluidic connection between the expansion sub-chamber 102 and the first heat exchanger 106 remains open (e.g. the inlet port remains open). Fluid is induced or admitted into the expansion sub-chamber 102 from the first heat exchanger 106 by increasing the volume of the expansion sub-chamber 102. In one example, fluid is admitted into the expansion chamber 102 by movement of the first piston 112 relative to the expansion chamber 103 to increase the volume of the expansion sub-chamber 102. In FIG. 3B, the piston 112 has begun a charge stroke and has moved in a first direction. The movement of the piston 112 admits fluid from the first heat exchanger 106 into the expansion sub-chamber 102. The fluid is admitted into the expansion sub-chamber 102 at an intake pressure. A first part (or phase) of the charge stroke may be known as the intake phase, as fluid is admitted to the expansion sub-chamber 102. This is represented at step 202 in FIG. 2B FIG. 3C shows the next step in the process (a second part or expansion phase of the charge stroke). At a predetermined point in the charge stroke of the piston 112, the expansion sub-chamber 102 is fluidically isolated from the first heat exchanger 106. In other words, the fluidic connection between the expansion sub-chamber 102 and the first heat exchanger 106 closes. That is to say that the inlet port is closed. This is shown at point 204 in FIG. 2B and is represented in FIG. 3C by the removal of the pipework 110 between the expansion sub-chamber 102 and the first heat exchanger 106. However, in practice, this may result from a valve closing between the expansion sub-chamber 102 and the first heat exchanger 106 and/or the expansion sub-chamber 102 being rotated to a position such that it is not open to or in fluid communication with the first heat exchanger 106. As mentioned above, the valve may be positioned at the inlet port of the expansion chamber or first heat exchanger (or both) or within pipework between the expansion sub-chamber 102 and the first heat exchanger 106.

After the expansion sub-chamber 102 has been fluidically isolated from the first heat exchanger 106, the piston 112 continues in the same direction of travel (i.e. the first direction) as during the intake phase of fluid into the expansion sub-chamber 102 to increase the volume of the expansion sub-chamber 102. That is to say that the piston 112 continues its charge stroke. This second part of the charge stroke may be known as the expansion phase and is shown at step 206 in FIG. 2B. The fluid that has been admitted into the expansion sub-chamber 102 expands through the rest of the expansion phase.

In some examples, the predetermined point in the charge stroke at which the expansion sub-chamber 102 becomes fluidically isolated may be at 50% of the way through the charge stroke. That is to say that during the first half of the charge stroke, fluid is admitted into the expansion sub-chamber 102 (i.e. the intake phase). Then, as the piston 112 passes the half-way point of the expansion chamber 103, the expansion sub-chamber 102 becomes fluidically isolated from the first heat exchanger 106 and the remaining 50% of the charge stroke is used to expand the fluid in the expansion sub-chamber 102 (i.e. the expansion phase). The ratio of volume of fluid in the expansion sub-chamber 102 at the end of the charge stroke to the volume of fluid in the expansion sub-chamber chamber when the expansion sub-chamber 102 is fluidically isolated (at the end of the intake phase) is known as the expansion ratio. In this example, there would be an expansion ratio of 2:1, as the fluid would double in volume. The predetermined point may be at least 10%, 25%, 33%, 40% of the way through the charge stroke. The predetermined point may be up to 60%, 67%, 75% or 90% of the way through the charge stroke.

In one example, the predetermined point is between 10-90% of the way through the charge stroke, more preferably, 25-75% of the way through the charge stroke.

The entire charge stroke associated with the increase in volume of the expansion sub-chamber 102 is therefore made up of two parts, intake and expansion. Their comparative proportion is known as the in-chamber volumetric expansion ratio. In some examples, the predetermined point at which intake ends and expansion starts during the increase in volume may be at 50% of the way through the charge stroke. With the charge stroke ending at 100% volume, the resulting in-chamber volumetric expansion ratio in this case being 2:1. In other examples, the predetermined point may occur at 10%, 20%, 30%, 40%, 60%, 70%, 80%, 90% of the charge stroke.

As the volume of the fluid in the expansion sub-chamber is increased during the expansion phase, the pressure of the fluid will decrease, and the temperature of the fluid will decrease. The amount by which the volume increases, and the pressure and temperature decreases is determined by the expansion ratio as described above. The expansion ratio of the expansion sub-chamber (and hence the predetermined point in which the expansion sub-chamber 102 is fluidically isolated) is set such that the pressure of the fluid within the expansion sub-chamber may reach a first threshold pressure at the end of the expansion phase. The first threshold pressure is less than the intake pressure, as shown over the step 206 in FIG. 2B. That is to say that the pressure of the fluid in the expansion sub-chamber 102 reduces until it drops to a pressure pursuant of the first threshold pressure.

Figure 3D:
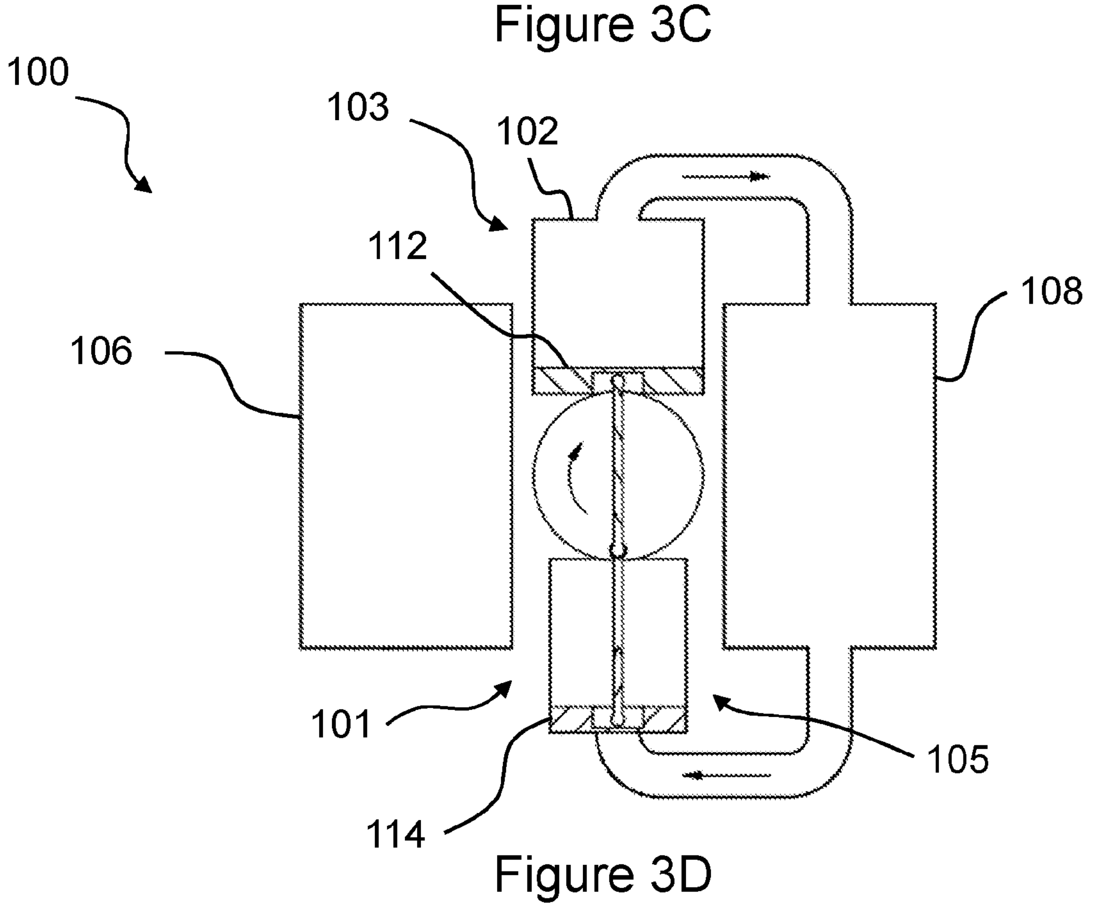
FIG. 3D shows a schematic view of the apparatus of FIG. 2A at a fourth point during a heat engine cycle.

FIG. 3D shows the piston 112 within the expansion chamber 103 at the end of the charge stroke such that the expansion sub-chamber 102 is at maximum volume. Once the piston 112 has completed the charge stroke, the fluid within the expansion sub-chamber 102 will have reached the first predetermined threshold (or minimum chamber pressure). The expansion sub-chamber 102 is then fluidically coupled with the second heat exchanger 108, for example by the expansion chamber outlet port opening. This is shown at step 208 in FIG. 2B. As described above, this fluidic coupling may be achieved via a valve opening between the expansion sub-chamber 102 and the second heat exchanger 108 and/or by the expansion sub-chamber 102 being moved to a position such that it is open to the second heat exchanger 108. The expansion sub-chamber 102 will not be coupled to both the first heat exchanger 106 and the second heat exchanger 108 at the same time.

At this stage, the compression sub-chamber 104 is also fluidically coupled to the second heat exchanger 108. That is to say that both the expansion sub-chamber 102 and the compression sub-chamber 104 are simultaneously coupled to the second heat exchanger 108.

Figure 3E:
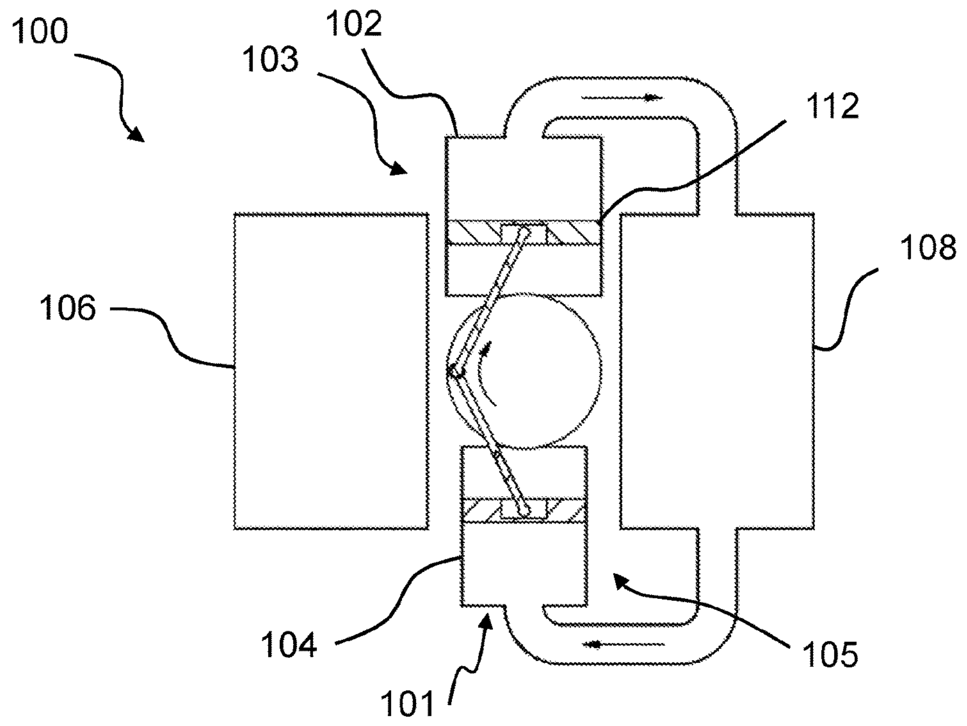
FIG. 3E shows a schematic view of the apparatus of FIG. 2A at a fifth point during a heat engine cycle.

FIG. 3E shows the next stage in the process. Fluid is transferred out of the expansion sub-chamber 102 to the second heat exchanger 108 by the reduction of the volume of the expansion sub-chamber 102. That is to say that the piston 112 within the expansion chamber 102 has begun a discharge stroke, or moves in a second direction, opposite to the first direction to reduce the volume of the expansion sub-chamber 102. The discharge stroke effectively transfers the fluid through to the second heat exchanger 108 and is shown by step 210 in FIG. 2B.

In the example in which the apparatus 100 is configured to work as a heat engine, the second heat exchanger 108 is configured to receive heat from the fluid. In other words, the enthalpy of the fluid is reduced as the fluid passes through the second heat exchanger 108. The second heat exchanger 108 may be referred to as a heat sink in this example. The expansion sub-chamber 102 and the second heat exchanger 108 may be fluidically coupled during the entire discharge stroke of the expansion sub-chamber 102.

During the discharge stroke, the pressure of the fluid within the expansion sub-chamber 102, the second heat exchanger 108 and the compression sub-chamber 104 may be substantially similar (e.g. the first threshold pressure), but the pressure of the fluid may reduce as a result of frictional forces exerted on the fluid as it passes through the pipework 110 and the second heat exchanger 108.

At the end of the discharge stroke, the piston 112 in the expansion chamber 103 returns to the starting position (i.e. the expansion sub-chamber 102 is at a minimum volume) as shown in FIG. 3A and the process of begins again.

Turning now to the compression sub-chamber 104. The expansion sub-chamber 102 and the compression sub-chamber 104 may operate in anti-phase. This arrangement is shown in FIG. 3D. That is to say that volume of the expansion sub-chamber 102 may be at a maximum as the volume of the compression sub-chamber 104 is at a minimum.

As the piston 112 in the expansion chamber 103 begins the discharge stroke, the piston 114 in the compression chamber 105 begins a charge stroke. That is to say that the compression sub-chamber 104 is fluidically coupled with the second heat exchanger 108 and fluid is admitted into the compression sub-chamber 104 from the second heat exchanger 108. In other words, the inlet port of the compression sub-chamber 104 is open. This step is shown in step 212 in FIG. 2B. Fluid is admitted into the second-sub-chamber 104 at a transfer pressure, which may be the same as the first threshold pressure described above. However, the pressure may reduce slightly as a result of frictional forces exerted on the fluid as it passes through the pipework 110 and second heat exchanger 108. This is shown in FIG. 3E.

The compression sub-chamber 104 and the second heat exchanger 108 may be fluidically coupled during the entire charge stroke of the piston 114 within the compression chamber 105. That is to say that as the volume of the compression sub-chamber is increased from a minimum to a maximum, the compression sub-chamber 104 is fluidically coupled to the second heat exchanger 108 and fluid is admitted into the compression sub-chamber 104 from the second heat exchanger 108.

Once the volume of the compression sub-chamber 104 reaches a maximum, the apparatus returns to the conditions shown in FIG. 3A. The fluid in the compression sub-chamber 104 will now be described. When the compression sub-chamber 104 is at a maximum volume, the compression sub-chamber 104 is fluidically isolated from the second heat exchanger 108. That is to say that the fluidic coupling between the compression sub-chamber 104 and the second heat exchanger 108 is removed. In other words, the compression chamber inlet port is closed. This is shows at step 214 in FIG. 2B. This may be the result of a valve closing and/or may occur due compression sub-chamber 104 being rotated to a position such that it is closed from the second heat exchanger 108. For completeness, the compression sub-chamber 104 is not fluidically coupled to the first heat exchanger 106 at this stage either.

FIG. 3B shows the next step in the process. The second piston 114 in the compression sub-chamber 104 has begun a discharge stroke. The discharge stroke is made up of a compression phase and an exhaust phase. The compression phase occurs during the first part of the discharge stroke and the exhaust phase occurs during a second part of the discharge stroke. In the compression phase, the volume of the compression sub-chamber 104 is reduced to compress the fluid in the compression sub-chamber 104. The fluid in the compression sub-chamber 104 may reach a second threshold pressure at the end of the compression phase. The second threshold pressure is higher than the transfer pressure referenced previously. The compression phase is shown in step 216 in FIG. 2B.

FIG. 3C is used to show the next step in the process. At a predetermined point, the compression sub-chamber 104 is fluidically coupled to the first heat exchanger 106. In other words, the fluidic connection between the compression sub-chamber 104 and the first heat exchanger 106 opens. This is represented in FIG. 3C by the addition of the pipework 110 between the compression sub-chamber 104 and the first heat exchanger 106. In other words, the outlet port of the compression chamber is opened. In practice, this may result from a valve opening between the compression sub-chamber 104 and the first heat exchanger 106 and/or the compression sub-chamber 104 being rotated to a position such that it is open to the first heat exchanger 106. As mentioned above, the valve may be positioned at a port of the compression sub-chamber 104.

After the compression chamber 104 has been fluidically coupled to the first heat exchanger 106, the discharge stroke now enters the exhaust phase in which fluid is transferred out of the compression sub-chamber 106 into the first heat chamber 106 by further reducing the volume of the compression sub-chamber 104. This may be achieved by the piston 114 continuing in the same direction. That is to say that the piston 114 continues its discharge stroke. The exhaust phase is shown at step 220 in FIG. 2B. The fluid that has been compressed during the compression phase of the discharge stroke is then transferred into the first heat exchanger 106 during the exhaust phase of the discharge stroke.

In some examples, the predetermined point in the discharge stroke may be at 50% of the way through the discharge stroke. That is to say that as the piston 114 passes the half-way point of the compression sub-chamber 104, the compression sub-chamber 104 becomes fluidically coupled with the first heat exchanger 106 and the remaining 50% of the discharge stroke is used to transfer the fluid to the first heat exchanger 106. The ratio of volume of fluid at the start of the discharge stroke to the volume of fluid in the compression sub-chamber 104 at the predetermined position at which the compression sub-chamber 104 is fluidically coupled to the first heat exchanger 106 is known as the compression ratio. In this example, there would be a compression ratio of 2:1, as the volume of the fluid would be halved. The predetermined point may be at least 10%, 25%, 33%, 40% of the way through the compression stroke. The predetermined point may be up to 60%, 67%, 75% or 90% of the way through the compression stroke. In one example, the predetermined point is between 10-90% of the way through the discharge stroke, more preferably, 25-75% of the way through the discharge stroke.

As the volume of the fluid in the compression sub-chamber 104 is decreased, the pressure of the fluid will increase, and the temperature of the fluid will increase. The amount by which the volume decreases, and the pressure and temperature increases is determined by the compression ratio of the compression sub-chamber 104. The compression ratio of the compression sub-chamber 104 (and hence the predetermined point in which the compression sub-chamber 104 is fluidically coupled to the first heat exchanger 106) may be set such that the pressure of the fluid reaches a second pressure threshold at the predetermined point. The second threshold pressure is higher when compared to the transfer pressure. That is to say that the pressure of the fluid in the second sub-chamber 104 would increase during the compression stroke until it reaches the second threshold pressure.

After the fluid has been transferred to the first heat exchanger 106, a full-cycle has occurred and the process returns to FIG. 3A.

As shown in the figures, in this example, there may be more than one process happening simultaneously. For example, fluid may be admitted into the expansion sub-chamber 102 as fluid is being compressed in the compression sub-chamber 104. Fluid may be expanded in the expansion sub-chamber 102 as fluid is being transferred from the compression sub-chamber 104 to the first heat exchanger 106. In other words, the charge stroke in the expansion sub-chamber 102 may occur at the same time as the discharge stroke in the compression sub-chamber 104. Also, the discharge stroke in the expansion sub-chamber 102 may occur at the same time as the charge stroke in the compression sub-chamber 104.

Figure 4A:
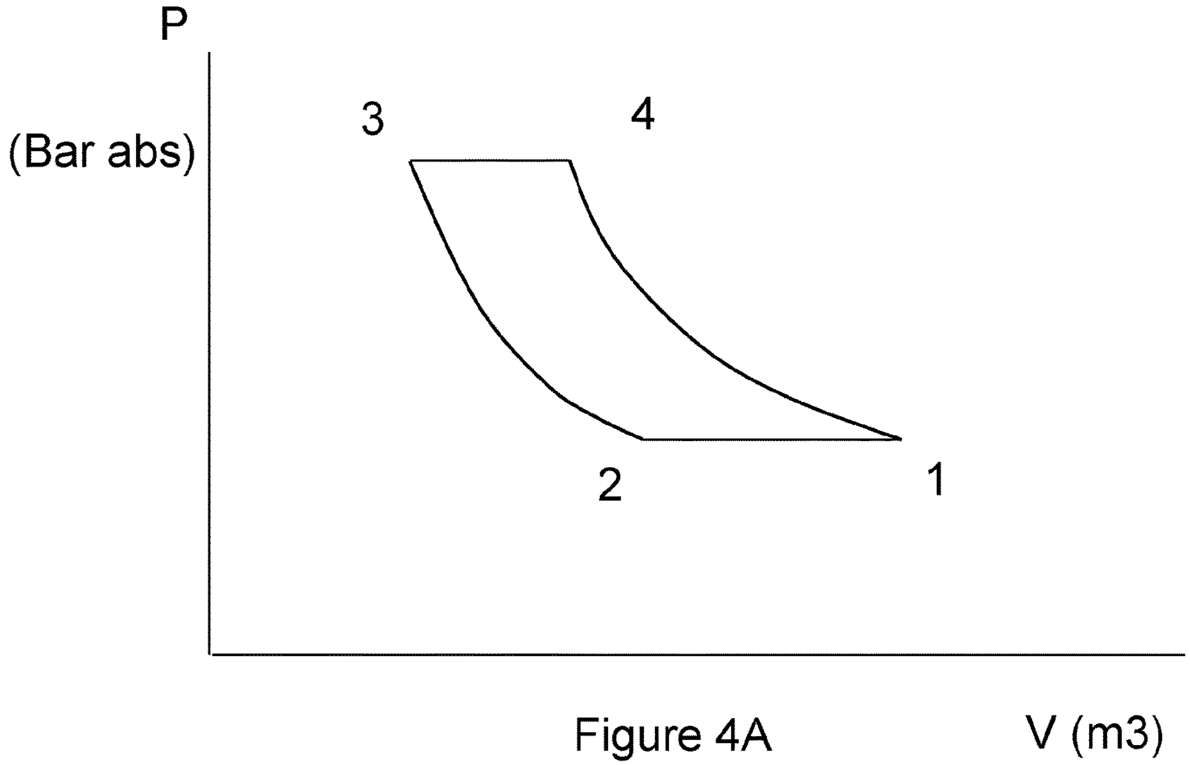
FIG. 4A shows a typical Pressure/Volume chart of the fluid during a cycle.

FIG. 4A shows an example of a Pressure-Volume chart of the process in which the apparatus 100 acts as a heat engine. Prior to the fluid being drawn into the expansion sub-chamber 102, the fluid is at a state between points 3 and 4. Point 4 on the chart represents the point at which the expansion sub-chamber 102 is fluidically isolated from the first heat exchanger 106.

Between points 4 to 1, the fluid undergoes an approximate adiabatic expansion. The fluidic expansion between points 4 to 1 correlates with the expansion of the fluid after the expansion sub-chamber 102 has become fluidically isolated.

Between points 1 to 2, the fluid undergoes substantially isobaric compression. By substantially isobaric compression, it is meant that the pressure does not change by more than 10%. This corresponds to the fluid being transferred through the second heat exchanger 108 to the compression sub-chamber 104. During this step, heat is extracted from the fluid.

Between points 2 to 3, the fluid is compressed in the compression sub-chamber 104 as the compression sub-chamber is fluidically isolated. This corresponds to the compression in the compression sub-chamber 104 shown in FIG. 3B. The fluid may be considered to undergo an approximate adiabatic compression at this stage.

Between points 3 and 4, the fluid that exits the compression sub-chamber 104 and enters the first heat exchanger 106 and receive a heat input. Note that the stage between 3 to 4 represents the change in fluid conditions as it exits the compression sub-chamber 104, being held in the first heat exchanger 106 for a period, then entering the expansion sub-chamber 102. The fluid may be considered to undergo expansion with heat addition. This step may be substantially isobaric. By substantially isobaric expansion, it is meant that the pressure does not change by more than 10%.

Points 1, 2, 3 and 4 are also shown in the process in FIG. 2B.

The process of expanding the fluid after the expansion sub-chamber 102 has been fluidically isolated means that the "polytropic" index is changed at a predetermined point through the expansion stroke. The polytropic index is defined by the relationship $PV^n=C$ (where n is the polytropic index).

In other words, during the first part (or intake phase) of the charge stroke in which the expansion sub-chamber 102 is in fluid communication with the first heat exchanger 106, the fluid follows a substantially isobaric expansion (as represented in the line between points 3 and 4) on FIG. 4A. During substantially isobaric expansion, the polytropic index is approximately equal to 0 (i.e. $PV^0=C$ or $P=C$). Again, by substantially isobaric, it is meant that the pressure does not change by more than 10%.

As the expansion sub-chamber 102 is fluidically isolated, the fluid may follow an approximate adiabatic expansion. During adiabatic expansion, the polytropic index is approximately equal to the ratio of specific heats $\gamma$, which is approximately 1.4 for air.

In other words, the polytropic index is changed at a predetermined point during the expansion stroke of the piston 112 in the expansion chamber 102.

The process of compressing the fluid in the compression sub-chamber 104 when the compression sub-chamber 104 is fluidically isolated and then subsequently fluidically coupling the compression chamber 104 to the first heat exchanger 102 means that the polytropic index is changed at a predetermined point through the discharge stroke of the piston 114.

In other words, during the first part of the discharge stroke in which the compression chamber 104 is fluidically isolated (i.e. the compression phase of the discharge stroke), the fluid follows an approximate adiabatic compression. During adiabatic compression, the polytropic index is approximately equal to the ratio of specific heats $\gamma$, which is approximately 1.4 for air.

Then during the second part (exhaust phase) of the discharge stroke in which the compression sub-chamber 104 is fluidically coupled with the first heat exchanger 106, the fluid may follow a substantially isobaric compression (as represented in the line between points 1 and 2) on FIG. 4A. During isobaric compression, the polytropic index is approximately equal to 0 (i.e. $PV^0=C$ or $P=C$). By substantially isobaric compression, it is meant that the pressure does not change by more than 10%.

In other words, the polytropic index is changed at a predetermined point during the discharge stroke in the compression sub-chamber 104 (i.e. at the end of the compression phase and beginning of the exhaust phase).

The Carnot efficiency of the apparatus 100 may be adjusted by setting the fluid expansion ratio of the expansion sub-chamber 102, the compression ratio of the compression sub-chamber 104 and the relative volumes of the expansion sub-chamber 102 and the compression sub-chamber 104.

Figure 4B:
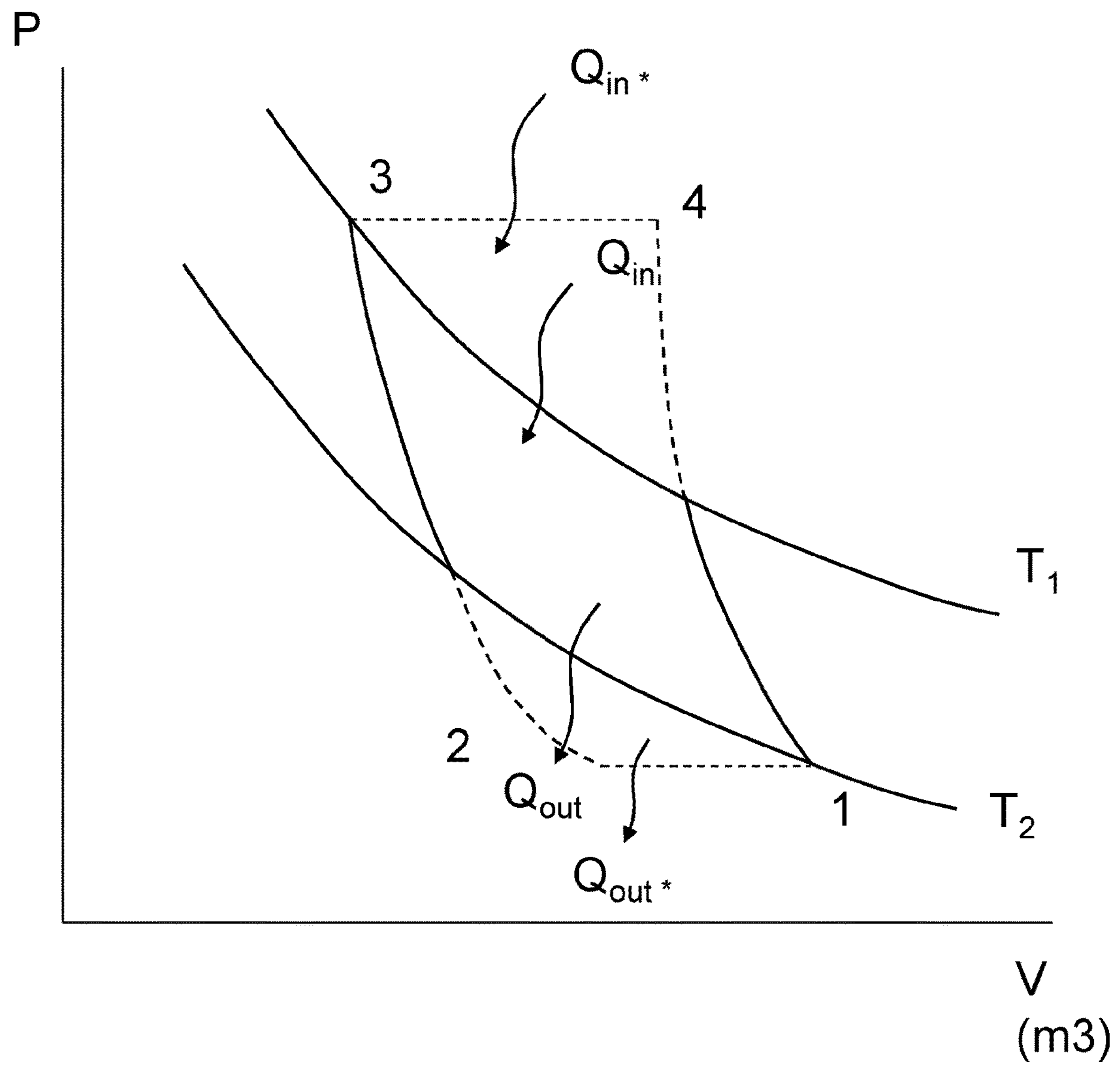
FIG. 4B shows an overlay of the pressure/volume cycle of the present invention as shown in FIG. 4A compared with the pressure/volume cycle of the Carnot cycle as shown in FIG. 1.

FIG. 4B shows an overlay of the pressure/volume cycle of the present invention compared with the pressure/volume cycle of the Carnot cycle. Cycle defined by the solid lines, which shows the Carnot cycle, is identical to the cycle shown in FIG. 1. The dashed lines in FIG. 4B represents the differences with the cycle of the present disclosure compared with the Carnot cycle. $Q_{in}$* and $Q_{out}$* are the heat energy absorbed into the fluid and the heat energy expelled from the fluid in the cycle of the present disclosure. The lines between 3 and 4, and 1 and 2 of the present disclosure are substantially isobaric. The use and pursuit of admitting fluid flow substantially isobarically is the result of significant modelling and testing by the applicant.

Figure 4C:
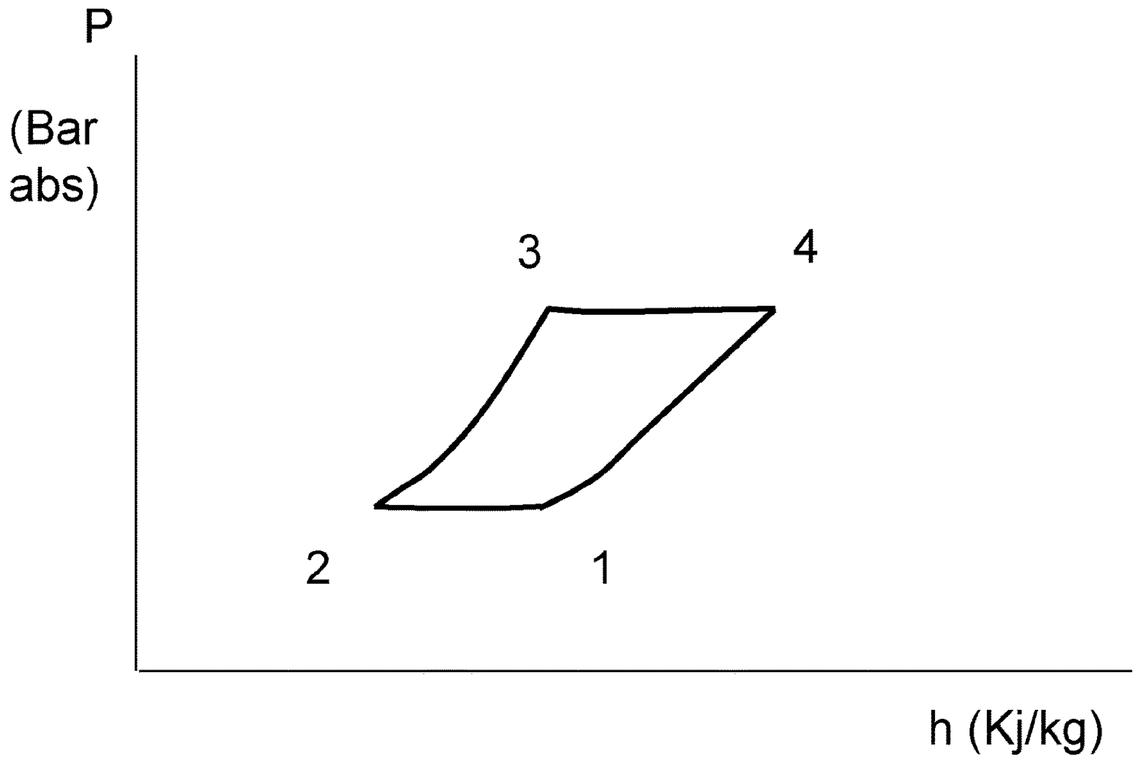
FIG. 4C shows a typical Pressure/Enthalpy chart of the fluid during a cycle.
Figure 4D:
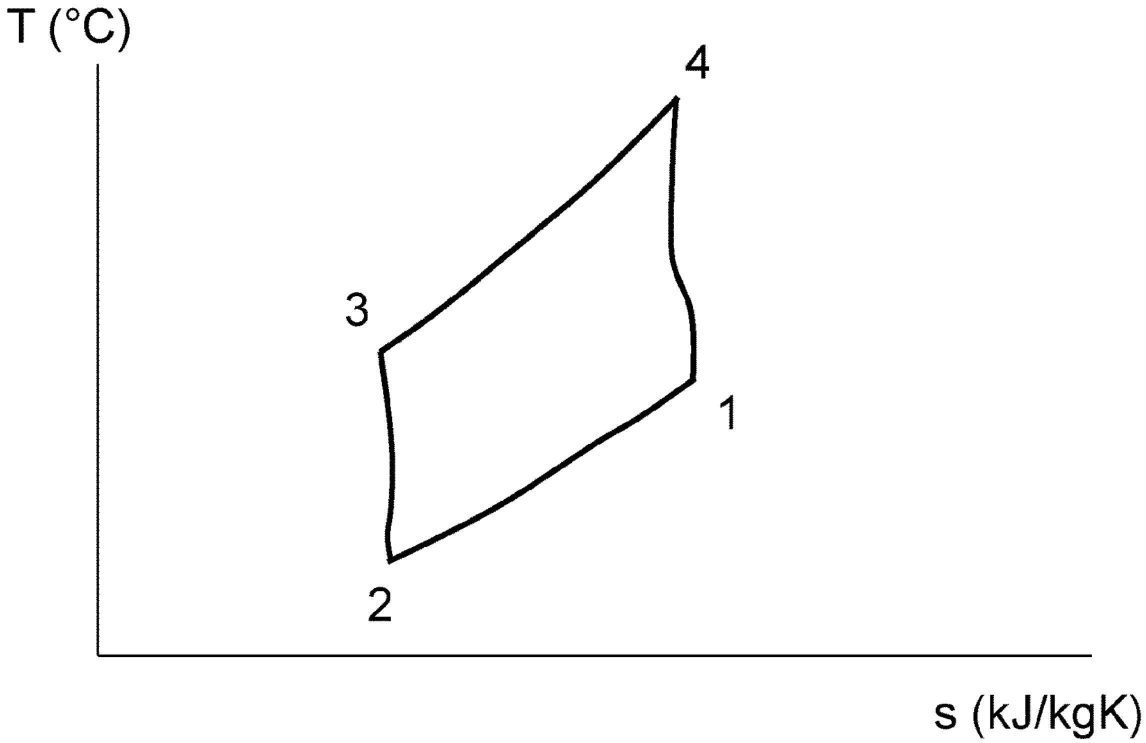
FIG. 4D shows a typical Temperature/Entropy chart of the fluid during a cycle.
Figure 5A:
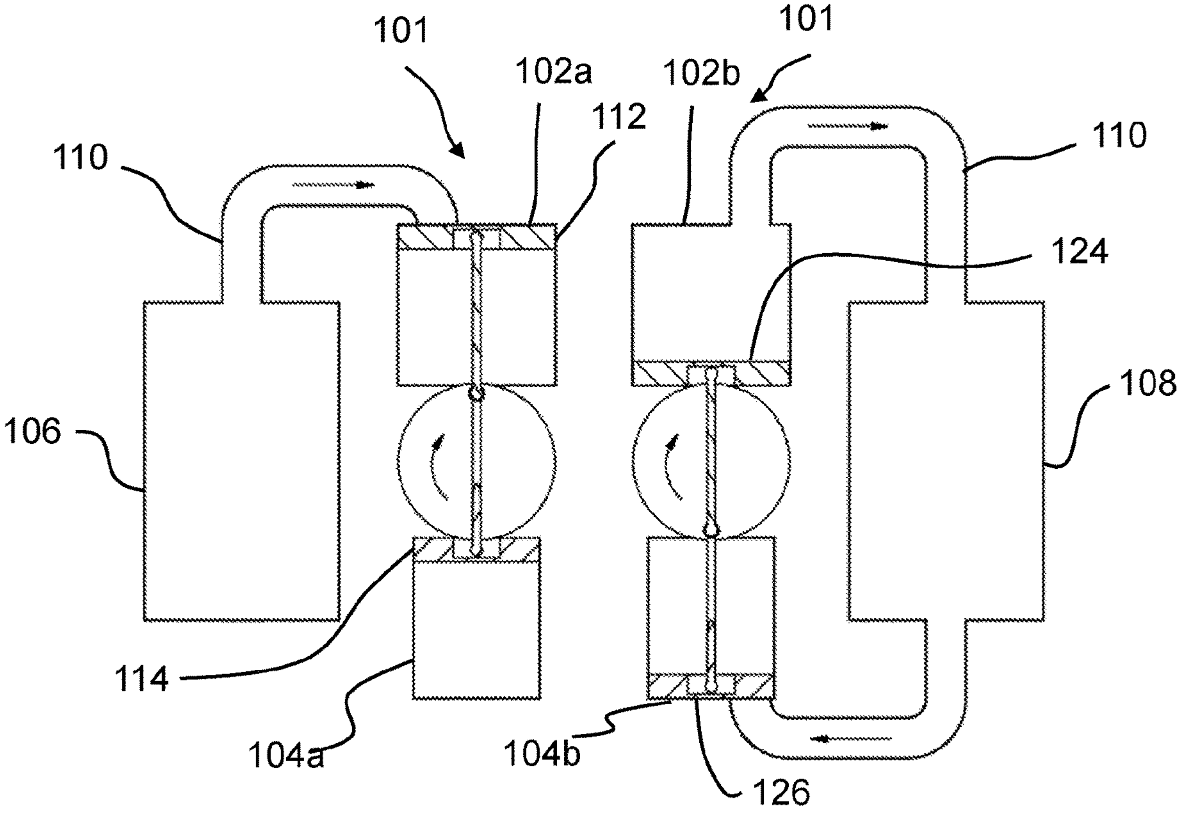
FIG. 5A shows a schematic view of a second example of an apparatus according to the present disclosure at a first point during a heat engine cycle.
Figure 5B:
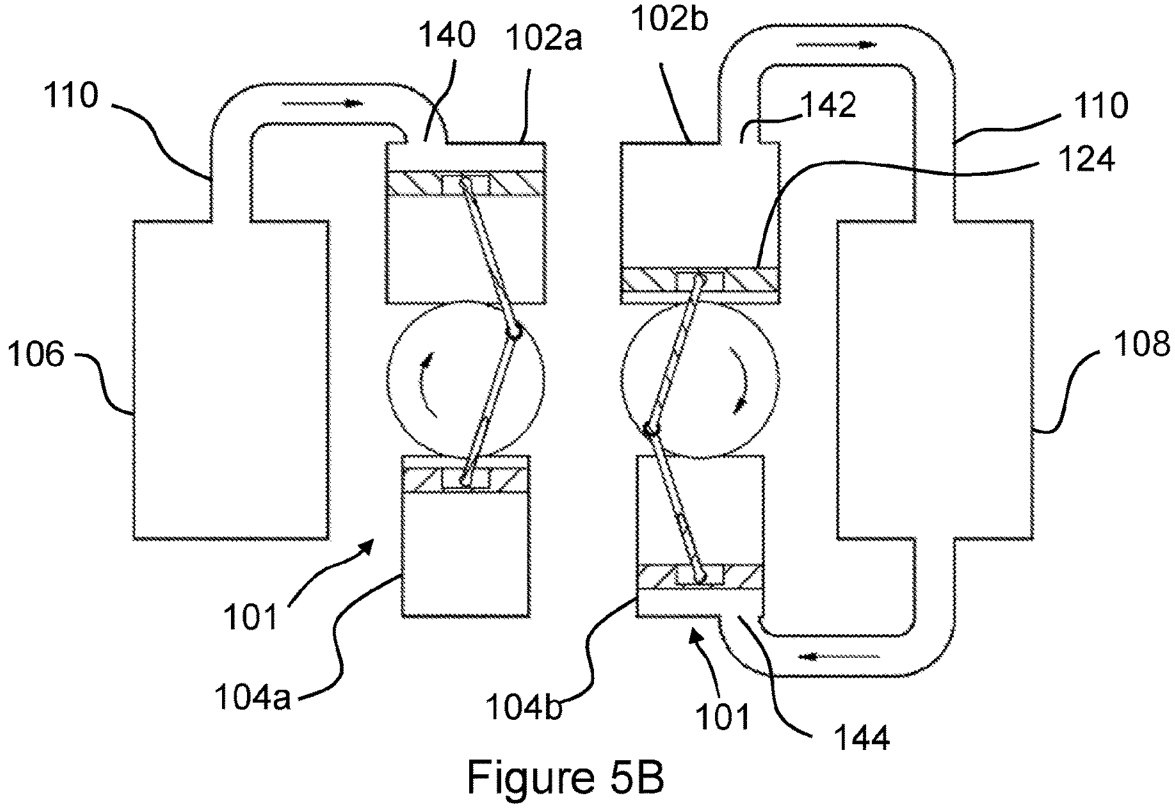
FIG. 5B shows a schematic view of the second example of the apparatus according to the present disclosure at a second point during a heat engine cycle.
Figure 5C:
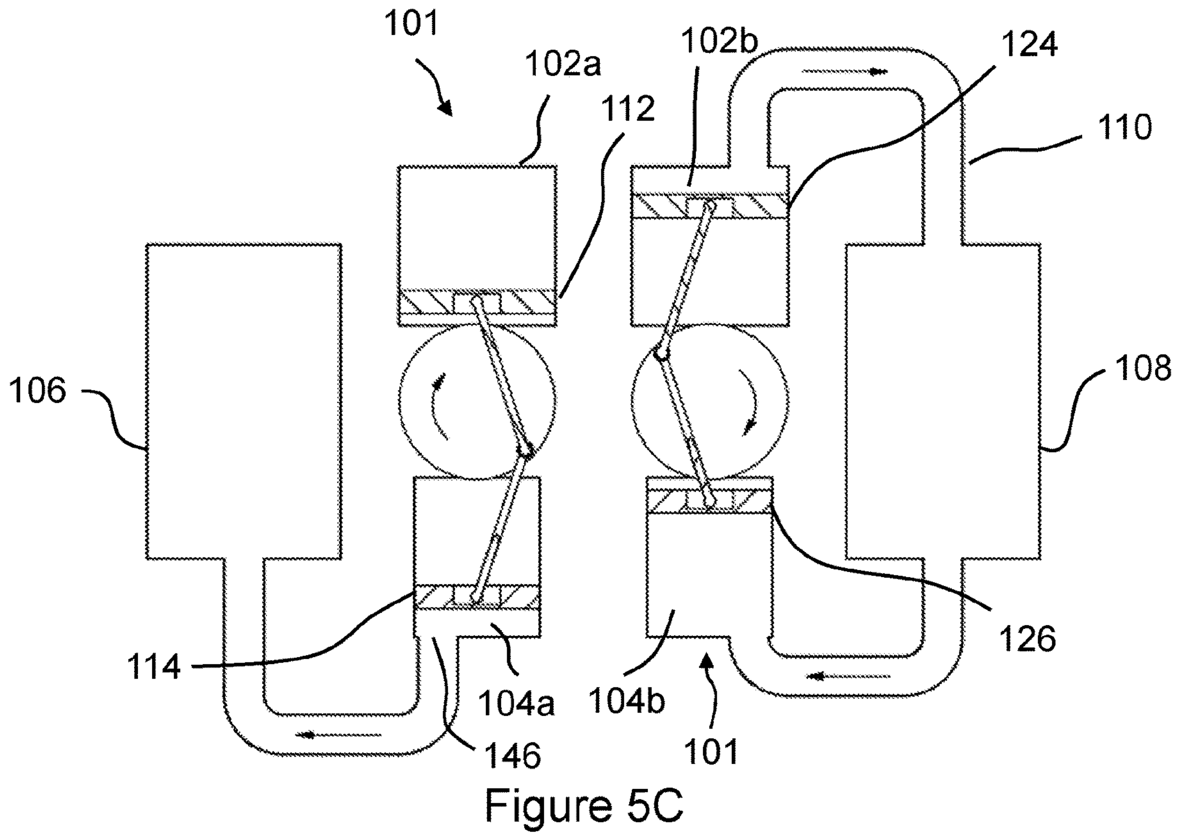
FIG. 5C shows a schematic view of the second example of the apparatus according to the present disclosure at a third point during a heat engine cycle.
Figure 5D:
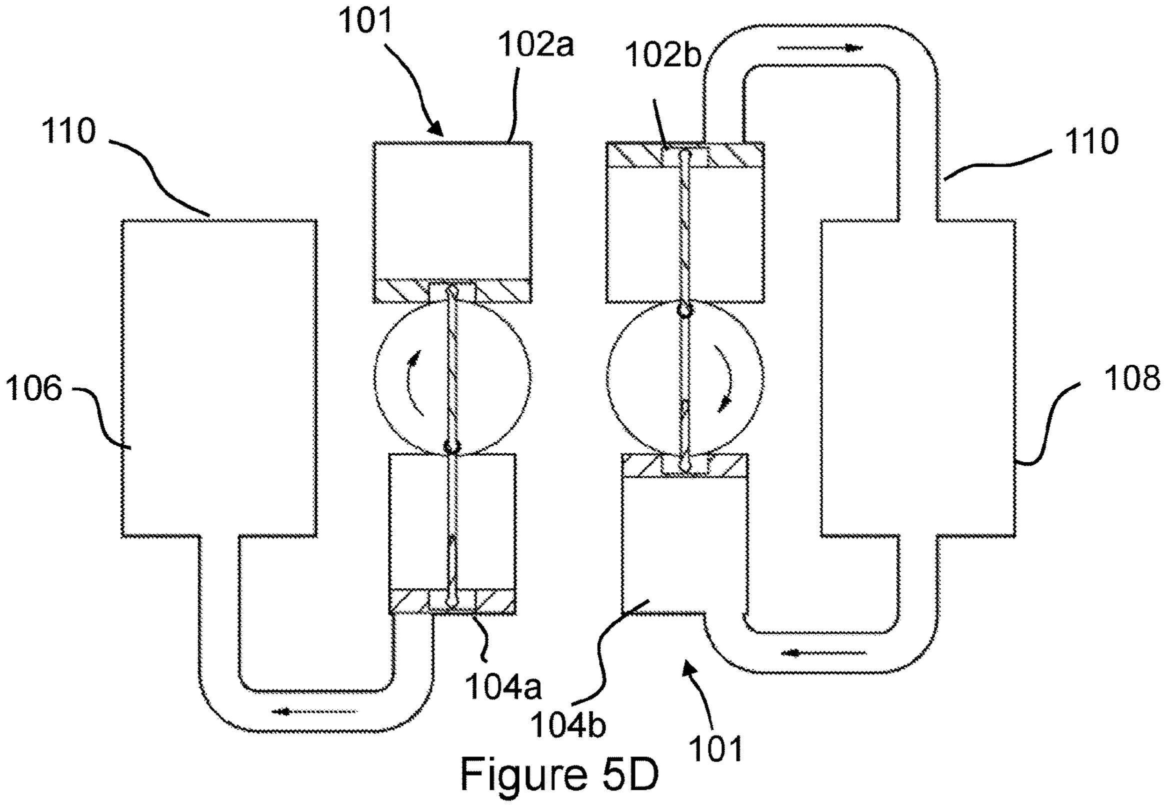
FIG. 5D shows a schematic view of the second example of the apparatus according to the present disclosure at a fourth point during a heat engine cycle.
Figure 5E:
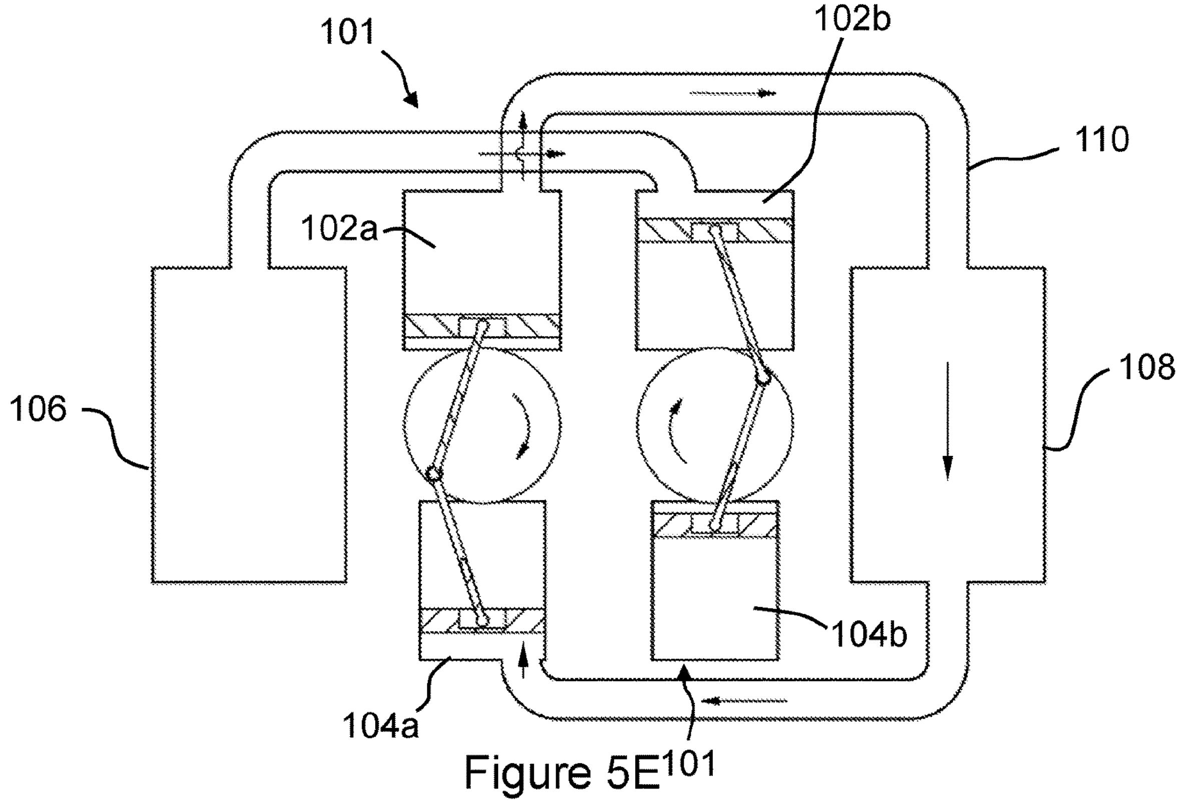
FIG. 5E shows a schematic view of the second example of the apparatus according to the present disclosure at a fifth point during a heat engine cycle.
Figure 5F:
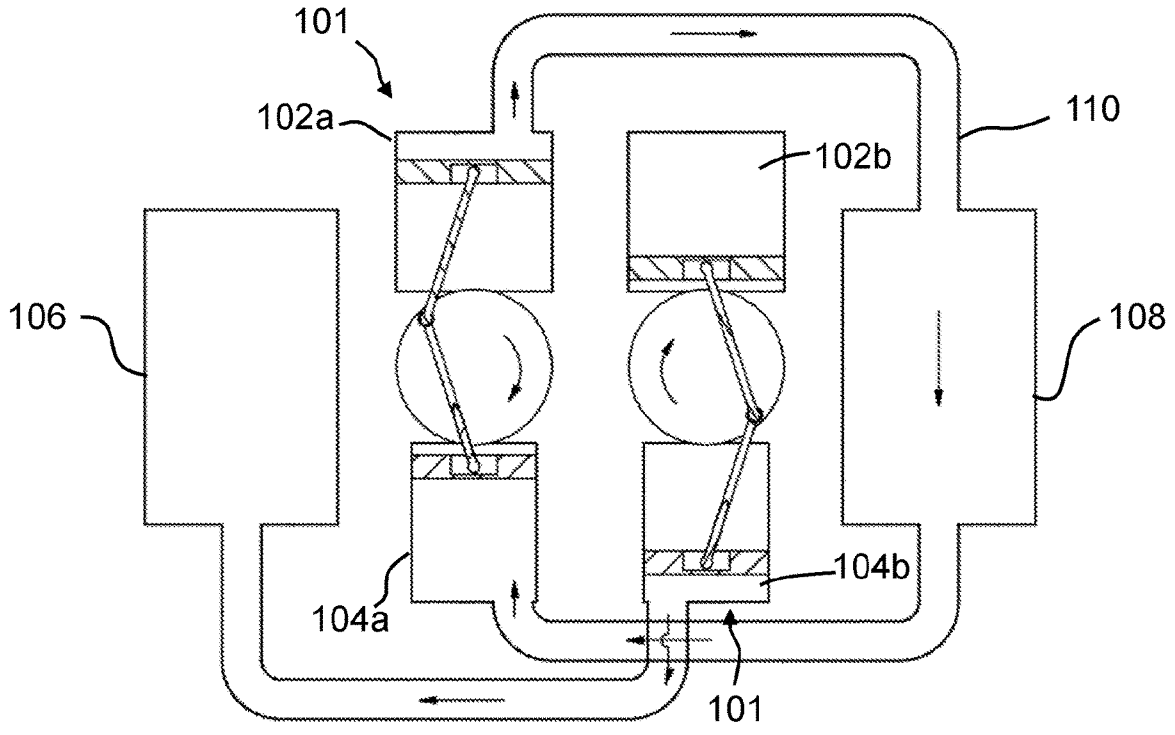
FIG. 5F shows a schematic view of the second example of the apparatus according to the present disclosure at a sixth point during a heat engine cycle.
Figure 6A:
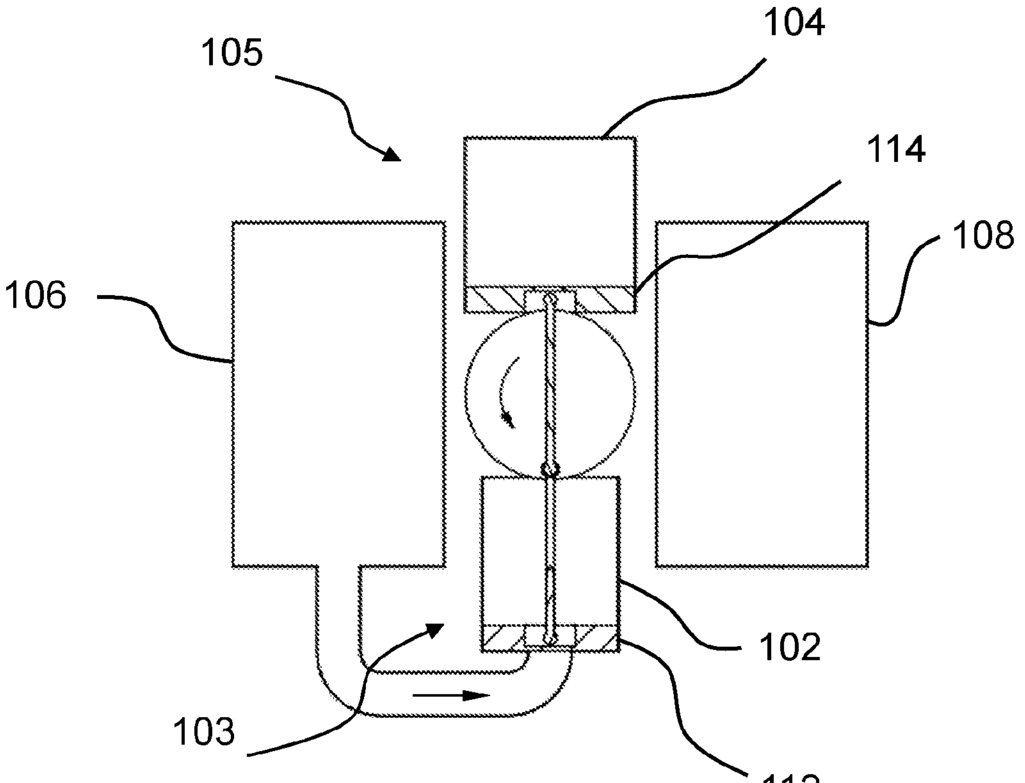
FIG. 6A shows a schematic view of the apparatus of FIG. 2 at a first point during a heat pump cycle.
Figure 6B:
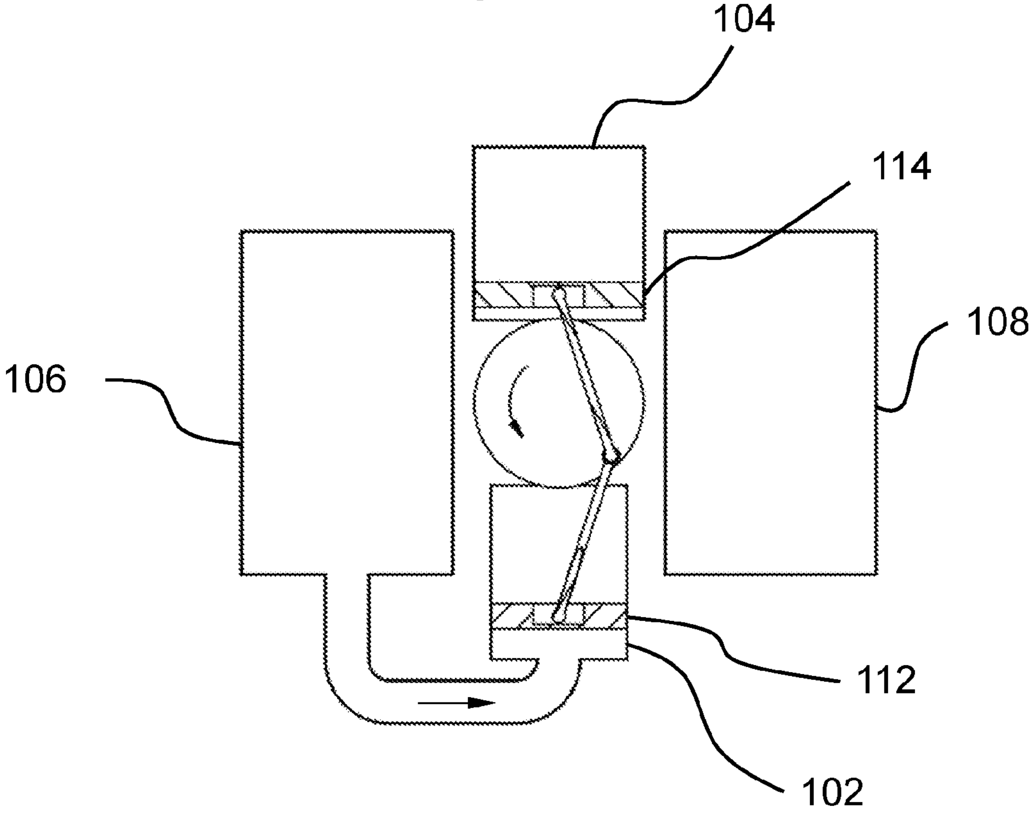
FIG. 6B shows a schematic view of the apparatus of FIG. 2 at a second point during a heat pump cycle.
Figure 6C:
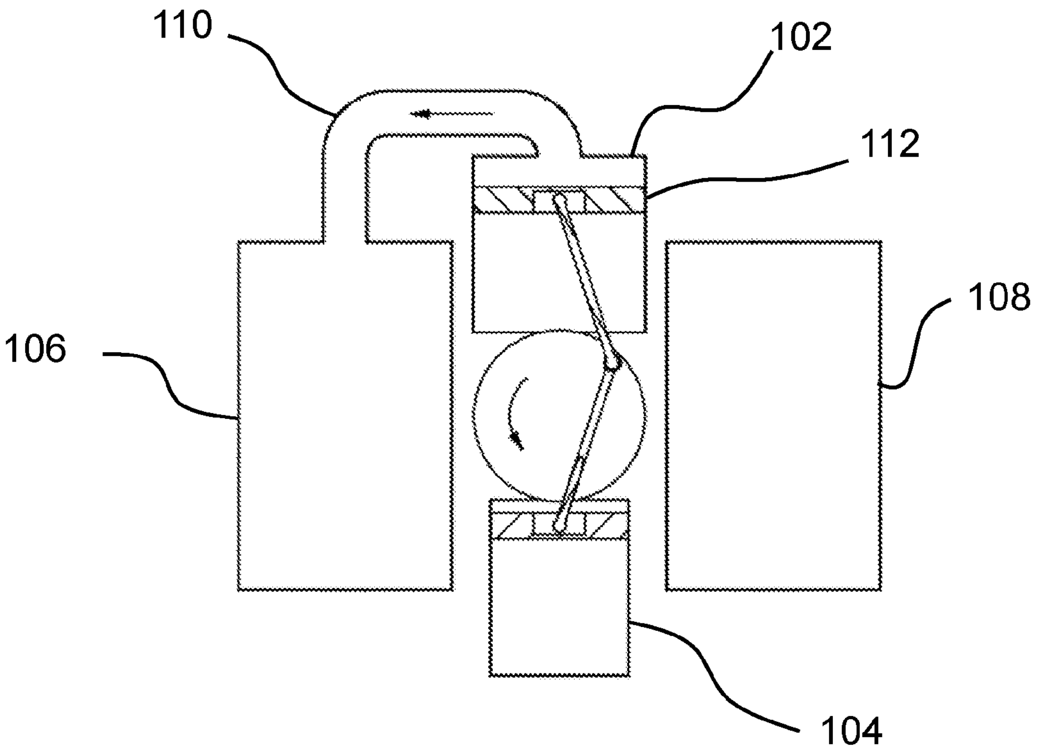
FIG. 6C shows a schematic view of the apparatus of FIG. 2 at a third point during a heat pump cycle.
Figure 6D:
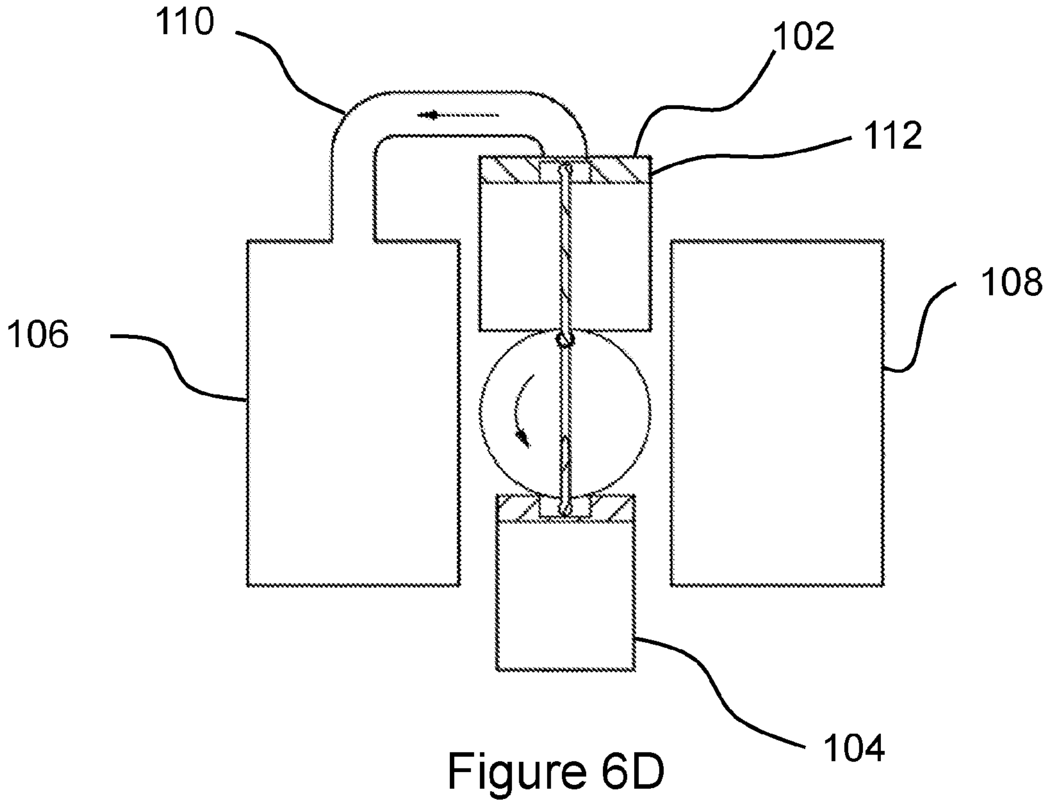
FIG. 6D shows a schematic view of the apparatus of FIG. 2 at a fourth point during a heat pump cycle.
Figure 6E:
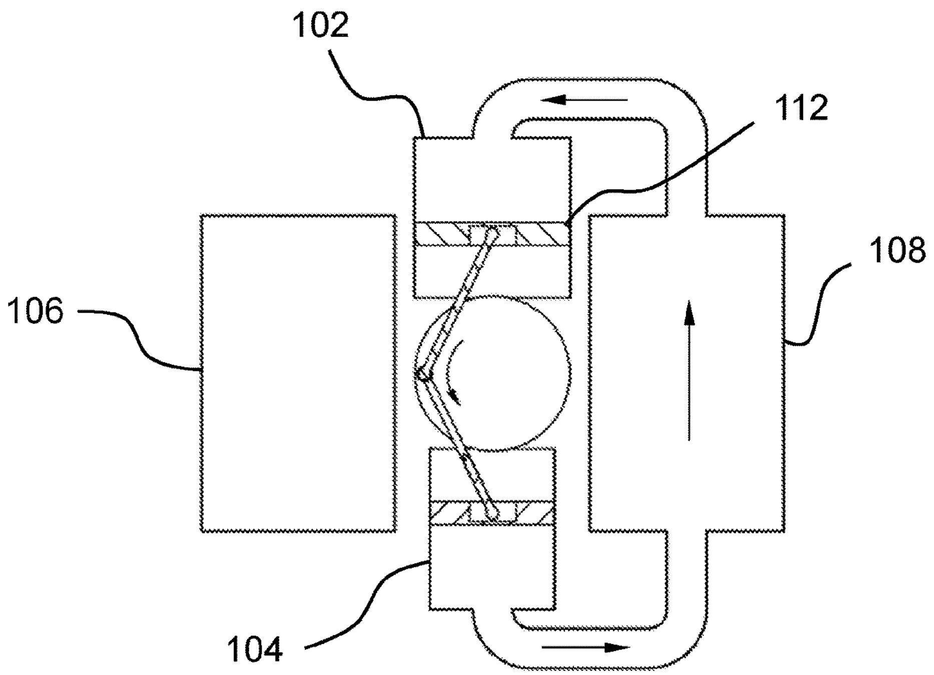
FIG. 6E shows a schematic view of the apparatus of FIG. 2 at a fifth point during a heat pump cycle.

FIG. 4C shows the pressure-enthalpy graph during the process and FIG. 4D shows the temperature-entropy graph during the process.

In one example, the first pressure threshold and the second pressure threshold are set such that the temperature of the fluid leaving the expansion sub-chamber 102 substantially matches the temperature of the fluid leaving the compression sub-chamber 104. An optimum balance of work and efficiency is achieved when the fluid temperature leaving the expansion sub-chamber 102 and the compression sub-chamber 104 are substantially the same. However, exceptions exist with alternative fluids or if there is a preference to prioritize either work or efficiency over the other.

In one example, the apparatus 100 includes two fluid displacement devices 101 each comprising an expansion sub-chamber and a compression sub-chamber. The two fluid displacement devices 101 are identical, but for the purpose of this description, the sub-chambers of the second fluid displacement device have been referenced as the second expansion sub-chamber 102*b* and second compression sub-chamber 104*b*. In other words, the apparatus includes a first fluid displacement device 101 comprising a first expansion sub-chamber 102*a* and a first compression sub-chamber 104*a* and a second fluid displacement device 101 comprising a second expansion sub-chamber 102*b* and a second compression sub-chamber 104*b*. The example of the apparatus including two fluid displacement devices 101 is shown in FIGS. 5A to 5E The second expansion sub-chamber 102*b* operates in an identical manner to the first expansion sub-chamber 102*a*, except that it may "out of phase" with respect to the first expansion sub-chamber 102*a* by 180 degrees. That is to say that as the piston 112 in the first expansion chamber 103 begins the intake phase of the charge stroke to admit fluid into the first expansion sub-chamber 102*a*, a piston 124 in a second expansion chamber may begin a discharge stroke to transfer fluid from the second expansion sub-chamber 102*b* to the second heat exchanger 108.

Similarly, the second compression sub-chamber 104*b* operates in an identical manner to the first compression sub-chamber 102, except that it may be "out of phase" by 180 degrees with respect to the first compression sub-chamber 104. That is to say that as the piston 114 in the compression chamber 105 begins the compression phase of the discharge stroke to compress fluid in the compression sub-chamber 104, the piston 126 in a second compression chamber begins a chare stroke to admit fluid into the second compression sub-chamber 104*b* from the second heat exchanger 108.

In some examples, the second fluid displacement device 101 may be out of phase with respect to the first fluid displacement device 101 by 90 degrees.

The provision of a second fluid displacement device 101 means that there is a consistent fluid flow through the heat exchangers during the whole cycle. The optimal fluid displacement device 101 count will more often be dictated by a combination of commercial and efficiency objectives. Typically, more sub-chambers, arranged in a complimentary manner with respect to timing, serve to stabilise flow and pressure fluctuations within the heat exchangers. The better stabilisation and agreement of pressures at each side of a fluid transfer point more often tend towards greater efficiency.

In an alternative example, the apparatus 100 may be operable as a heat pump. That is to say that the apparatus 100 is configured to receive work, for example in the form of a work driving the pistons 112, 114 and transfer heat from cold reservoir (for example the second heat exchanger 108) to a hot reservoir (for example, the first heat exchanger 106).

The steps of the process are shown in FIG. 6A to 6E. The apparatus 100 used as a heat pump is effectively identical to the apparatus 100 being used as a heat engine, except the processes are reversed.

In this example, the expansion sub-chamber 102 may have a smaller volume compared with the compression sub-chamber 104.

In the example of the apparatus 100 acting as a heat pump, the expansion sub-chamber 102 and the compression sub-chamber 104 are effectively "switched" relative to their arrangement in the apparatus acting as a heat engine. In other words, the expansion sub-chamber 102 is now shown in the bottom of the apparatus in FIG. 6A and the compression sub-chamber 104 is now shown on the top of the apparatus in FIG. 6A. This is for ease of reference for describing the sub-chambers, but in practice various relative geometries and arrangements of the expansion sub-chamber 102 and compression sub-chamber 104 are possible.

FIGS. 6A to 6E show the various steps of the operation of the apparatus 100 working as a heat pump. The operations are identical to the operations in FIGS. 3A to 3E, except that the flow of the fluid is reversed. Further, heat is added to the fluid in the second exchanger 108 and extracted from the fluid in the first heat exchanger 106.

Figure 7:
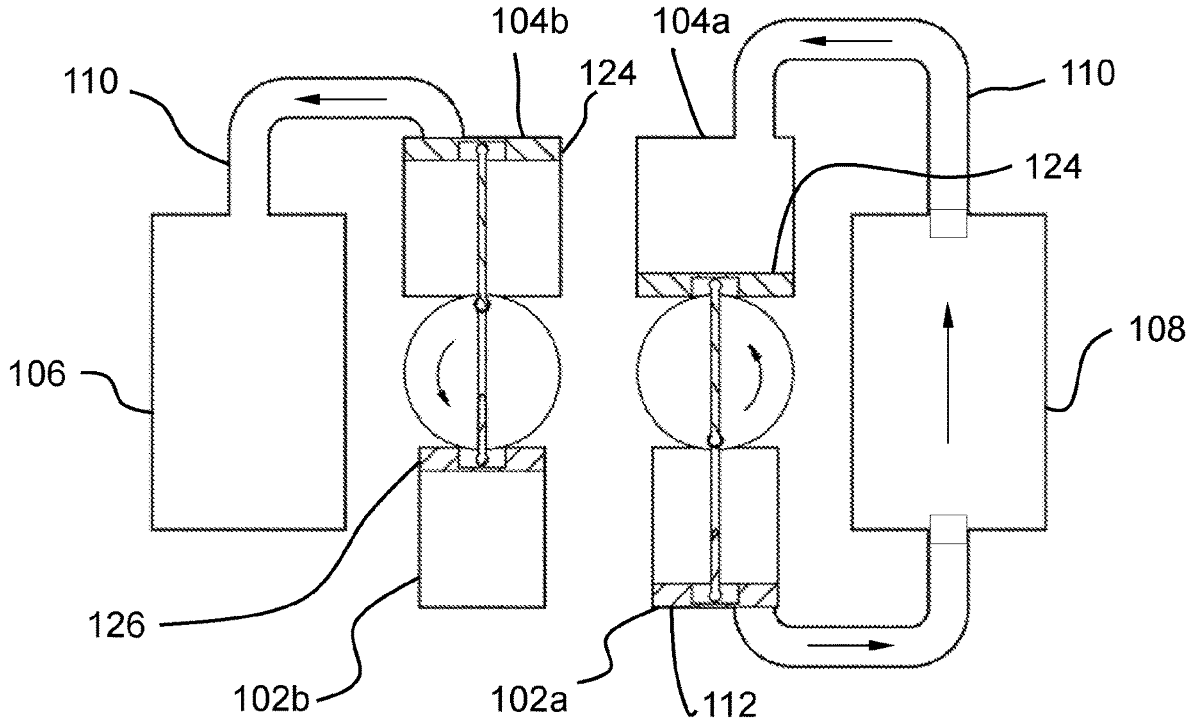
FIG. 7 shows a schematic view of a second example of apparatus configured as a heat pump according to the present disclosure.

As with the example of the apparatus 100 working as a heat engine, the apparatus 100 working as a heat pump may also second fluid displacement device, as shown in FIG. 7.

The fluid may be a refrigerant fluid or other media, for example, but not limited to, air, Ethanol, R22, Super saturated $CO_2$. Ammonia (NH3) or Propane (C3H8).

In one example, the apparatus comprises a fluid displacement device comprising a rotatable shaft 150 on which a first piston 112 is provided. This apparatus is shown in FIG. 8. The shaft defines a first axis 152 about which the piston rotates. The fluid displacement device may also include a first axle defining a second rotational axis 154, the first shaft extending through the first axle. The first piston extends from the first axle towards a distal end of the first shaft. The fluid displacement device includes a first rotor 156 carried on the first axle and the first rotor comprises an expansion chamber 103 through which the first piston 112 extends. The expansion sub-chamber 102 may be considered to be an instantaneous, but variable sized, aspect of an expansion chamber 103 on a first side of the piston 112. In this example, the apparatus may comprise two expansion sub-chambers 102 located on either side of the piston 112. These will be referred to as a first expansion sub-chamber 102*a* and a second expansion sub-chamber 102*b*. In other words, both the first expansion sub-chamber 102*a* and the second expansion sub-chamber 102*b* are located within the expansion chamber 103.

The first expansion sub-chamber 102*a* and the second expansion sub-chamber 102*b* operate 180 degrees out of phase with each other. That is to say that as the first expansion sub-chamber 102*a* is undergoing a charge stroke, the second expansion sub-chamber 102*b* located on the other side of the piston 112 is undergoing a discharge stroke. Additionally, as the first expansion sub-chamber 102*a* is undergoing a discharge stroke, the second expansion sub-chamber 102*b* located on the other side of the piston 112 is undergoing a charge stroke.

Both the charge stroke and the discharge stroke result from the relative movement between the first piston 112 and the expansion chamber 103. Throughout one entire rotation of the shaft 150, the first and second expansion sub-chambers will undergo the same operations, just 180 degrees out of phase with each other. As such, in FIG. 8 only the first 180 degrees of rotation is shown, because between 180 degrees and 360 degrees, the operation of the first expansion sub-chamber 102*a* is identical to the operation of the second expansion sub-chamber 102*b* from 0 to 180 degrees. The operation of the second expansion sub-chamber 102*a* is identical to the operation of the first expansion sub-chamber 102*b* from 0 to 180 degrees.

The expansion chamber 103 may include a first port and second port to provide flow communication with the expansion chamber 103. The first port and the second port of the expansion chamber may be known as an expansion chamber inlet port 140 and outlet port 142 respectively.

The fluid displacement device may also include a compression chamber 105 and two compression sub-chambers 104 (referred to as a first compression sub-chamber 104*a* and a second compression sub-chamber 104*b*), which operate in a similar manner due the relative movement of a second piston 114 moving relative to the compression chamber 105. That is to say that the first compression sub-chamber 104*a* and the second compression sub-chamber 104*b* are located in the compression chamber 105.

The compression chamber 105 may also have a first port and a second port. The first port and a second port of the compression chamber may be known as the second chamber inlet port 144 and outlet port 146 respectively.

In this example, the first rotor 156 and first axle are rotatable with the first shaft 150 around the first rotational axis 152; and the first rotor is pivotable about the axle about the second rotational axis 154 to permit the first rotor 156 to pivot relative to the first piston 112 as the first rotor rotates about the first rotational axis. In operation, the first axis 152 may be fixed and the second axis 154 rotates around the first axis.

The fluid displacement device may be arranged such that through-out a 360-degree rotation of the shaft 150 about the first axis 152, the first expansion sub-chamber 102*a* is in fluidic contact with the first heat exchanger or the second heat exchanger 108 respectively at selected points during the rotation. That is to say that the first expansion sub-chamber 102*a* may be arranged relative to the first heat exchanger 106 and the second heat exchanger 108 such that it is fluidically coupled to the first heat exchanger 106 or the second heat exchanger 108 and fluidically isolated from the first heat exchanger 106 and the second heat exchanger 108 at various times throughout the rotation of the shaft. There may be times when the first expansion sub-chamber 102*a* is fluidically isolated from both heat exchangers, coupled to just one heat exchanger or fluidically coupled with both heat exchangers. The first compression sub-chamber 104*a* maybe arranged in a similar fashion so it is also fluidically coupled with and fluidically isolated with the first heat exchanger 106 and the second heat exchanger 108 at various times throughout the rotation of the shaft. There may be times when the first compression sub-chamber 104*a* is fluidically isolated from both heat exchangers, coupled to just one heat exchanger or fluidically coupled with both heat exchangers.

In some examples, the apparatus includes a first fluid displacement device and a second fluid displacement device as described above. The second fluid displacement device may be 90 degrees or 180 degrees out of phase with the first fluid displacement device. The provision of a first fluid displacement device and a second fluid displacement device may lead to commercial or performance advantage, a multiplicity of sub-chambers may be employed. These may be linked, independent and may be displaced with respect to timing to operate in a complimentary manner.

FIG. 8 shows an example of a cycle of the apparatus 100 when used in a heat engine or heat pump. FIG. 8 column (i) shows the alignment of the expansion chamber 103 inlet and outlet ports 140, 142 with the first expansion sub-chamber 102*a* and the second expansion sub-chamber 102*b*.

FIG. 8 column (ii) shows a cross section of the apparatus.

FIG. 8 column (iii) shows the alignment of the compression chamber 105 inlet and outlet ports 144, 146 with the first compression sub-chamber 104*a* and the second compression sub-chamber 104*b*.

FIG. 8 row (a) shows the state of each sub-chamber 102*a*, 102*b*, 104*a*, 104*b* when the piston 112, 114 is at a nominal 0-degree angular position in a cycle where the angular position refers to rotation about the first axis 152. The first expansion sub-chamber 102*a* and the second compression sub-chamber 104*b* are at minimum volume and each are ready to begin a charging stroke through to admit fluid into them. The second expansion sub-chamber 102*b* and the first compression sub-chamber 104*a* are at a maximum volume and are each ready to begin a discharging stroke.

During the cycle, the first expansion sub-chamber 102*a* and the first compression sub-chamber 104*a* operate in anti-phase to one another.

That is, when one of the first expansion and compression sub-chambers 102*a*, 104*a* undergoes a charging stroke, the other chamber undergoes a discharging stroke. Additionally, the first and second expansion sub-chambers 102*a*, 102*b* operate in antiphase with one another, and the first and second compression sub-chambers 104*a*, 104*b* operate in antiphase with one another.

FIG. 8 row (b) shows the state of each sub-chamber 102*a*, 102*b*, 104*a*, 104*b* when the shaft 150 (and hence piston(s) 112, 114) has rotated to a 45-degree position in the cycle. At this stage, the first expansion sub-chamber 102*a* undergoes the intake phase of the charging stroke. In other words, the first expansion sub-chamber 102*a* may be fluidically coupled with a first heat exchanger to admit fluid. The inlet port 140 of the expansion chamber 103 may be considered to be open and fluid may flow via the inlet port of the expansion chamber 140 into the first expansion sub-chamber 102*a*. The first expansion sub-chamber 102*a* may receive fluid at substantially constant pressure. The volume of the first expansion sub-chamber 102*a* increases to admit the fluid.

Between FIG. 8 row (a) and FIG. 8 row (b), the first compression sub-chamber 104*a* has begun a compression phase of a discharge stroke. That is to say that the volume of the first compression sub-chamber 104*a* has decreased and the fluid within the first compression sub-chamber 104*a* has increased.

As shown in FIG. 8 row (b (iii)), the first compression sub-chamber 104*a* is still fluidically isolated during the compression phase of the discharge stroke. In this example, this may be due to the first compression sub-chamber 104*a* not being in fluid communication with the compression chamber outlet port 146. In other words, the compression chamber outlet port 146 is closed.

Therefore, fluid is compressed within the first compression sub-chamber 104*a*, which increases the pressure and temperature of the fluid. In this compression phase, the pressure of the fluid may increase to a second threshold pressure.

In FIG. 8 row (b), the expansion chamber outlet port 142 is open to the second expansion sub-chamber 102*b* and the compression chamber inlet port 144 is open to the second compression sub-chamber 104*b*. The fluid exits the second expansion sub-chamber 102*b* into the second heat exchanger 108 and fluid enters the second compression sub-chamber 104*b* from the second heat exchanger 108. Thus, as the shaft 150 rotates through the configuration shown in FIG. 8 row (b), the second expansion sub-chamber 102*b* decreases in volume and the second compression sub-chamber 104*b* increases in volume.

FIG. 8 row (c) shows the state of each sub-chamber 102*a*, 102*b*, 104*a*, 104*b* rotated to a 90-degree position in the cycle. In FIG. 8 row (c), the first expansion sub-chamber 102*a* is now fluidically isolated. In one example, this is due to the fluidic connection between the expansion chamber inlet port 140 and the first expansion sub-chamber 102*a* now being closed (i.e. the expansion chamber inlet port 140 closing). The second expansion sub-chamber 102*b* continues to be open and be fluidically coupled to a second heat exchanger 108 such that fluid is transferred to the second heat exchanger 108 at this stage.

From 90 degrees onwards, the first compression sub-chamber 104*a* begins to be open to the compression chamber outlet port 146. In other words, the first compression sub-chamber 104*a* and the first heat exchanger 106 may be fluidically coupled from 90 degrees. In other words, the compression chamber exhaust port 146 opens from 90 degrees.

The second compression sub-chamber 104*b* remains open to the compression chamber inlet port 144.

FIG. 8 row (d) shows the state of each chamber 102*a*, 102*b*, 104*c*, 104*d* rotated to a 135-degree position in the cycle. At this stage, the first expansion sub-chamber 102*a* is now fluidically isolated and is undergoing the expansion phase of the charge stroke. That is to say that the volume of the first expansion sub-chamber 102*a* increases as the first expansion sub-chamber 102*a* is fluidically isolated.

The second expansion sub-chamber 102*b* is still fluidically coupled to the second heat exchanger and continues on the discharge stroke to transfer fluid to the second heat exchanger 108.

The first compression sub-chamber 104*a* is now in fluidic communication with the first heat exchanger 106 and so is in the transfer phase of the discharge stroke. In other words, the first compression chamber 104*a* may be in fluid communication with the compression chamber outlet port 146.

The second compression sub-chamber 104*b* is still in fluid communication with the second heat exchanger 108 to receive fluid therefrom.

Between 180 degrees and 360 degrees the above process is repeated but with the expansion sub-chambers 104*a*, 104*b* reversed and with the compression chambers 104*a*, 104*b* reversed.

Figure 9:
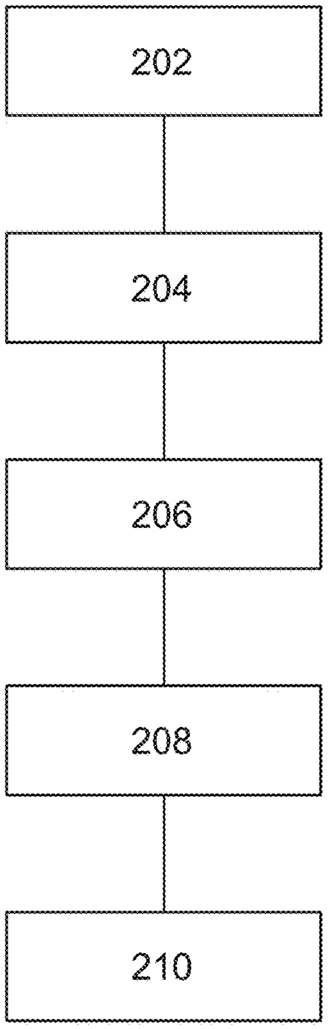
FIG. 9 shows an example of a flow chart of the method.
Figure 10:
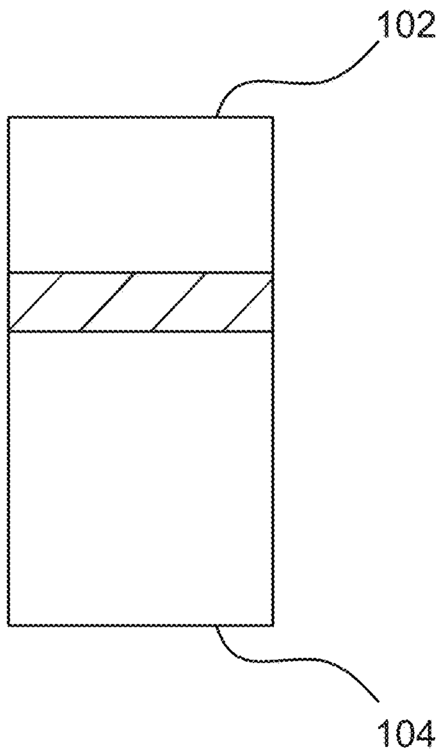
FIG. 10 shows a schematic view of an expansion sub-chamber and a compression sub-chamber located on either side of a piston.

FIG. 9 show a flow chart of the method of operating a thermodynamic apparatus 100 configured as a heat engine or heat pump, the thermodynamic apparatus 100 comprising, in flow series, a first heat exchanger 106, an expansion sub-chamber 102 and a second heat exchanger 108. Step 202 relates admitting a fluid flow at an intake pressure from the first heat exchanger 106 into the expansion sub-chamber 102 by increasing the volume of the expansion sub-chamber 102. Step 204 relates to fluidically isolating the fluid within the expansion sub-chamber 102 from the first heat exchanger 106. Step 206 relates to expanding the fluid within the expansion sub-chamber 102 by further increasing the volume of the expansion sub-chamber 102 until said fluid reaches a first threshold pressure, the first threshold pressure being less than the intake pressure.

Step 208 relates to fluidically coupling the expansion sub-chamber 102 to the second heat exchanger 108. Step 210 relates to transferring fluid flow out of the expansion sub-chamber 102 to the second heat exchanger 108 by reducing the volume of the expansion sub-chamber 102.

In one example, the fluid is not compressed within the compression sub-chamber 104. For example, if the fluid leaving the second heat exchanger is a liquid, then the compression sub-chamber 104 may act as a pump, may be supplemented by a pump, or may be replaced by a pump to transfer the liquid. The pump may be used to transfer the liquid from the first threshold pressure to the second threshold pressure without undergoing a compression.

In one example, the method described above may be operated on an alternative positive displacement machine to those described above.

The invention claimed is:

1. A method of operating a thermodynamic apparatus configured as a heat engine or heat pump, the thermodynamic apparatus comprising a rotatable shaft on which a rotatable piston is provided, the piston extending through an expansion chamber to define an expansion sub-chamber, wherein rotation of the shaft rotates the piston relative to the expansion chamber to change the volume of the expansion sub-chamber;

the thermodynamic apparatus comprising, in flow series, a first heat exchanger, the expansion sub-chamber and a second heat exchanger, the method comprising transferring fluid from the first heat exchanger to the second heat exchanger via the expansion sub-chamber by rotating the shaft and the piston;

aligning an expansion chamber inlet port with the expansion sub-chamber and admitting a fluid flow at an intake pressure from the first heat exchanger into the expansion sub-chamber by increasing the volume of the expansion sub-chamber;

closing the expansion chamber inlet port and fluidically isolating the fluid within the expansion sub-chamber from the first heat exchanger;

expanding the fluid within the expansion sub-chamber by further increasing the volume of the expansion sub-chamber to reduce the pressure of the fluid from the intake pressure;

aligning an expansion chamber outlet port with the expansion sub-chamber and fluidically coupling the expansion sub-chamber to the second heat exchanger; and transferring fluid out of the expansion sub-chamber to the second heat exchanger by reducing the volume of the expansion sub-chamber, wherein the process of admitting a fluid flow at an intake pressure from the first heat exchanger into the expansion sub-chamber is substantially isobaric;

wherein the thermodynamic apparatus comprises a compression sub-chamber that operates in anti-phase with the expansion sub-chamber.

2. The method according to claim 1, comprising:

transferring fluid out of the second heat exchanger at a transfer pressure to the compression sub-chamber by increasing the volume of the compression sub-chamber.

3. The method according to claim 2, comprising:

fluidically isolating the compression sub-chamber from the second heat exchanger;

increasing the pressure of the fluid within the compression sub-chamber by reducing the volume of the compression sub-chamber.

4. The method according to claim 3, comprising:
fluidically coupling the compression sub-chamber with the first heat exchanger; and
transferring fluid out of the compression sub-chamber to the first heat exchanger by reducing the volume of the compression sub-chamber.

5. The method according to claim 3, wherein the temperature of the fluid leaving the expansion sub-chamber is approximately equal to the temperature of the fluid leaving the compression sub-chamber.

6. The method according to claim 1, wherein the process of expanding the fluid within the expansion sub-chamber by further increasing the volume of the expansion sub-chamber is approximately adiabatic.

7. The method according to claim 2, wherein the process of transferring fluid flow out of the second heat exchanger to the compression sub-chamber is substantially isobaric.

8. The method according to claim 3, wherein the process of increasing the pressure of the fluid within the compression sub-chamber by reducing the volume of the compression sub-chamber is approximately adiabatic.

9. The method according to claim 1, wherein the piston is a first piston, and the expansion sub-chamber is a variable volume aspect defined by the expansion chamber and the first piston.

10. The method according to claim 9, wherein the step of the volume of the expansion sub-chamber being increased to admit fluid flow from the first heat exchanger into the expansion sub-chamber occurs during an intake phase of a charge stroke in which there is relative movement in a first direction between the first piston and the expansion chamber.

11. The method according to claim 10, wherein the step of further increasing the volume of the expansion sub-chamber occurs during an expansion phase of the charge stroke in which there is continued relative movement in the first direction between the first piston and the expansion chamber.

12. The method according to claim 10, wherein the step of transferring fluid flow out of the expansion sub-chamber to the second heat exchanger by reducing the volume of the expansion sub-chamber occurs during a discharge stroke in which there is relative movement of the first piston and the expansion chamber in a second direction, which is opposite to the direction of relative movement in the charge stroke.

13. The method according to claim 3, wherein the apparatus comprises a compression chamber and a second piston, and the compression sub-chamber is a variable volume aspect defined by the compression chamber and the second piston, wherein the step of transferring fluid flow out of the second heat exchanger at a transfer pressure to the compression sub-chamber by increasing the volume of the compression sub-chamber occurs during a charge stroke in which there is relative movement of the second piston and the compression chamber.

14. The method according to claim 13, wherein the step of increasing the pressure of the fluid within the compression sub-chamber by reducing the volume of the compression sub-chamber occurs during a compression phase of discharge stroke in which there is relative movement of the second piston in direction, opposite to the direction of relative movement in the charge stroke of the compression sub-chamber.

15. The method according to claim 14, wherein the first piston and the second piston are integral with each other.

16. The method according to claim 9, wherein the expansion sub-chamber and compression sub-chamber are located on either side of the first piston, wherein movement of the first piston changes the volume of the expansion sub-chamber and the compression sub-chamber.

17. The method according to claim 9, wherein the expansion sub-chamber and the compression sub-chamber are located in different machines.

18. The method according to claim 2,
wherein the thermodynamic apparatus comprises a second expansion sub-chamber and a second compression sub-chamber, the method comprising:
transferring fluid flow out of second expansion sub-chamber to the second heat exchanger at the transfer pressure by reducing the volume of the second expansion sub-chamber as fluid flow is being admitted and expanded in the first expansion sub-chamber.

19. The method according to claim 18, comprising:
transferring fluid flow out of the second heat exchanger into the second compression sub-chamber by increasing the volume of the second compression sub-chamber as fluid flow is being transferred out of the second expansion sub-chamber;
fluidically isolating the second compression sub-chamber from the second heat exchanger;
increasing the pressure of the fluid within the second compression sub-chamber by reducing the volume of the second compression sub-chamber.

20. The method according to claim 19, comprising:
fluidically coupling the second compression sub-chamber with the first heat exchanger; and
transferring said fluid-flow out of the second compression sub-chamber to the first heat exchanger by continuing to reduce the volume of the second compression sub-chamber, wherein these steps occur as fluid flow is being transferred to the second heat exchanger from the first expansion sub-chamber.

21. The method according to claim 1, wherein the thermodynamic apparatus is configured to work as a heat engine and heat is removed from the fluid as it passes through the second heat exchanger.

22. The method according to claim 1, wherein the thermodynamic apparatus is configured to work as a heat pump and heat is added to the fluid as it passes through the second heat exchanger.

23. A thermodynamic apparatus configured as a heat engine or heat pump:
a first heat exchanger;
a second heat exchanger;
an expansion chamber comprising:
a rotatable shaft;
a rotatable piston on the shaft with the piston extending through the expansion chamber to define an expansion sub-chamber;
a compression sub-chamber;
wherein the expansion chamber is configured to:
admit a fluid flow from the first heat exchanger at an intake pressure into the expansion sub-chamber by increasing the volume of the expansion sub-chamber;
fluidically isolate the fluid within the expansion sub-chamber;
expand the fluid within the expansion sub-chamber by further increasing the volume of the expansion sub-chamber to reduce the pressure of the fluid from the intake pressure;
fluidically couple the expansion sub-chamber to the second heat exchanger; and transfer fluid flow out of the expansion sub-chamber to said second heat exchanger by reducing the volume of the expansion sub-chamber, wherein the process of admitting a fluid flow at an intake pressure from the first heat exchanger into the expansion sub-chamber is configured to be substantially isobaric;

wherein the expansion sub-chamber operates in anti-phase with the compression sub-chamber.

24. The thermodynamic apparatus according to claim 23, wherein the thermodynamic apparatus configured to:

transfer fluid flow out of the second heat exchanger at a transfer pressure to the compression sub-chamber by increasing the volume of the compression sub-chamber.

25. The thermodynamic apparatus according to claim 24, wherein the thermodynamic apparatus is configured to:

fluidically isolate the compression sub-chamber from the second heat exchanger;

compress the fluid within the compression sub-chamber by reducing the volume of the compression sub-chamber to increase the pressure of the fluid.

26. The thermodynamic apparatus according to claim 25, wherein the thermodynamic apparatus is configured to:

fluidically couple the compression sub-chamber with the first heat exchanger; and transfer fluid flow out of the compression sub-chamber to the first heat exchanger by reducing the volume of the compression sub-chamber.

27. The thermodynamic apparatus according to claim 23, wherein the expansion sub-chamber is a variable volume aspect defined by the expansion chamber and the piston.

28. The thermodynamic apparatus according to claim 27, wherein the volume of the expansion sub-chamber is configured to be increased to admit fluid flow from the first heat exchanger into the expansion sub-chamber during an intake phase of a charge stroke in which there is relative movement in a first direction between the first piston and the expansion chamber.

29. The thermodynamic apparatus according to claim 28, wherein the thermodynamic apparatus is configured to further increase the volume of the expansion sub-chamber to reduce the pressure of the fluid during an expansion phase of the charge stroke in which the relative movement of the piston and the expansion chamber is configured to continue to move in the first direction.

30. The thermodynamic apparatus according to claim 27, wherein the piston is configured to move relative to the expansion chamber in a second direction during a discharge stroke, the second direction being opposite to the first direction to reduce the volume of the expansion sub-chamber to transfer fluid flow out of the expansion sub-chamber to the second heat exchanger.

31. The thermodynamic apparatus according to claim 24, wherein the piston is a first piston and wherein the thermodynamic apparatus comprises a compression chamber and a second piston and the compression sub-chamber is a variable volume aspect defined by the compression chamber and the second piston, wherein the volume of the compression sub-chamber is configured to be increased during a charge stroke in which there is relative movement of the second piston and the compression chamber.

32. The thermodynamic apparatus according to claim 23, wherein the thermodynamic apparatus is configured to act as a heat engine to drive a powertrain or generate electricity.

33. The thermodynamic apparatus according to claim 23, wherein the thermodynamic apparatus is configured to act as a heat pump, the apparatus comprising a motor to drive the thermodynamic apparatus.

* * * * *